US012143870B2

United States Patent
Bressanelli et al.

(10) Patent No.: US 12,143,870 B2
(45) Date of Patent: Nov. 12, 2024

(54) SECURITY HANDLING OF 5GS TO EPC RESELECTION

(71) Applicant: QUALCOMM Incorporated, San Diego, CA (US)

(72) Inventors: Dominique Francois Bressanelli, Eschborn (DE); Osama Lotfallah, San Diego, CA (US); Cogol Tina, Mission Viejo, CA (US); Abhishek Bhatnagar, San Diego, CA (US); Vitaly Drapkin, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/662,978

(22) Filed: May 11, 2022

(65) Prior Publication Data
US 2022/0369176 A1 Nov. 17, 2022

Related U.S. Application Data

(60) Provisional application No. 63/187,784, filed on May 12, 2021.

(51) Int. Cl.
*H04W 60/04* (2009.01)
*H04W 36/00* (2009.01)

(52) U.S. Cl.
CPC ... *H04W 36/0038* (2013.01); *H04W 36/0022* (2013.01)

(58) Field of Classification Search
CPC .......... H04W 36/0022; H04W 36/305; H04W 36/0038; H04W 60/04; H04W 52/0235
See application file for complete search history.

(56) References Cited

U.S. PATENT DOCUMENTS

2010/0177737 A1 7/2010 Song et al.
2011/0275371 A1 11/2011 Roger
(Continued)

OTHER PUBLICATIONS

3GPP TS 24.301: "3rd Generation Partnership Project, Technical Specification Group Core Network and Terminals, Non-Access-Stratum (NAS) protocol for Evolved Packet System (EPS), Stage 3 (Release 17)", 3gpp Standard, Technical Specification, 3GPP, Mobile Competence Centre, 650, Route Des Lucioles, F-06921 Sophia-Antipolis Cedex, France, vol. CT WG1, No. V17.2.0, Apr. 2, 2021, pp. 1-588, XP052000429, section 5.5.3.2.7.
(Continued)

*Primary Examiner* — Anez C Ebrahim
(74) *Attorney, Agent, or Firm* — Procopio, Cory, Hargreaves & Savitch

(57) ABSTRACT

Aspects disclosed herein facilitate security handling of 5GS to EPC reselection are disclosed herein. An example method at a UE includes transmitting a first TAU request, the first TAU request encoded using a first security context associated with a first RAT, the first TAU request being integrity protected using a first uplink count based on the first security context, and the first TAU request including a first set of information including an identifier mapped to a second RAT associated with the first network entity. The example method also includes transmitting a second TAU request, the second TAU request including the first set of information, the second TAU request being integrity protected using a second uplink count. The example method also includes communicating based on a mapped security context based on the first security context and at least one of the first uplink count or the second uplink count.

23 Claims, 17 Drawing Sheets

(56) References Cited

U.S. PATENT DOCUMENTS

| | | | |
|---|---|---|---|
| 2013/0070669 A1 | 3/2013 | Haynes et al. | |
| 2013/0269001 A1 | 10/2013 | Janakiraman et al. | |
| 2015/0016382 A1 | 1/2015 | Yuk et al. | |
| 2018/0310170 A1 | 10/2018 | He | |
| 2018/0368039 A1* | 12/2018 | Wu | H04W 8/20 |
| 2019/0327653 A1 | 10/2019 | Jin et al. | |
| 2020/0008054 A1* | 1/2020 | Wifvesson | H04L 9/0861 |
| 2020/0296634 A1 | 9/2020 | Guo | |
| 2020/0337012 A1* | 10/2020 | Tiwari | H04L 1/0055 |
| 2021/0368378 A1 | 11/2021 | Kim et al. | |
| 2023/0111156 A1* | 4/2023 | Watfa | H04W 12/106 455/410 |

OTHER PUBLICATIONS

3GPP TS 33.501: "3rd Generation Partnership Project, Technical Specification Group Services and System Aspects, Security Architecture and Procedures for 5G System (Release 17)", 3GPP Standard, Technical Specification, 3GPP, Mobile Competence Centre, 650, Route Des Lucioles, F-06921, Sophia-Antipolis Cedex, France, vol. SA WG3, No. V17.1.0, Apr. 6, 2021, pp. 1-256, XP052000595, sections 8.5 8.6, p. 134-136, figures 8.5.2-1.

Intel: "Correction of TAU Abnormal Case for the Network", 3GPP TSG-CT WG1 Meeting #113, 24301_CR3134R1 (REL-15)_C1-188872, 3rd Generation Partnership Project, Mobile Competence Centre, 6501 Route Des Lucioles, F-06921 Sophia-Antipolis Cedex, France, vol. CT WG1, No. West Palm Beach (FL), USA, Nov. 26, 2018-Nov. 30, 2018, Dec. 9, 2018, pp. 1-4, XP051547392, p. 1-p. 4.

International Search Report and Written Opinion—PCT/US2022/029035—ISA/EPO—Aug. 30, 2022.

3GPP TS 33.501: "3rd Generation Partnership Project, Technical Specification Group Services and System Aspects, Security Architecture and Procedures for 5G System (Release 17)", 3GPP Standard, Technical Specification, 3GPP, Mobile Competence Centre, 650, Route Des Lucioles, F-06921 Sophia-Antipolis Cedex, France, V17.8.0, Dec. 2022, pp. 1-286.

* cited by examiner

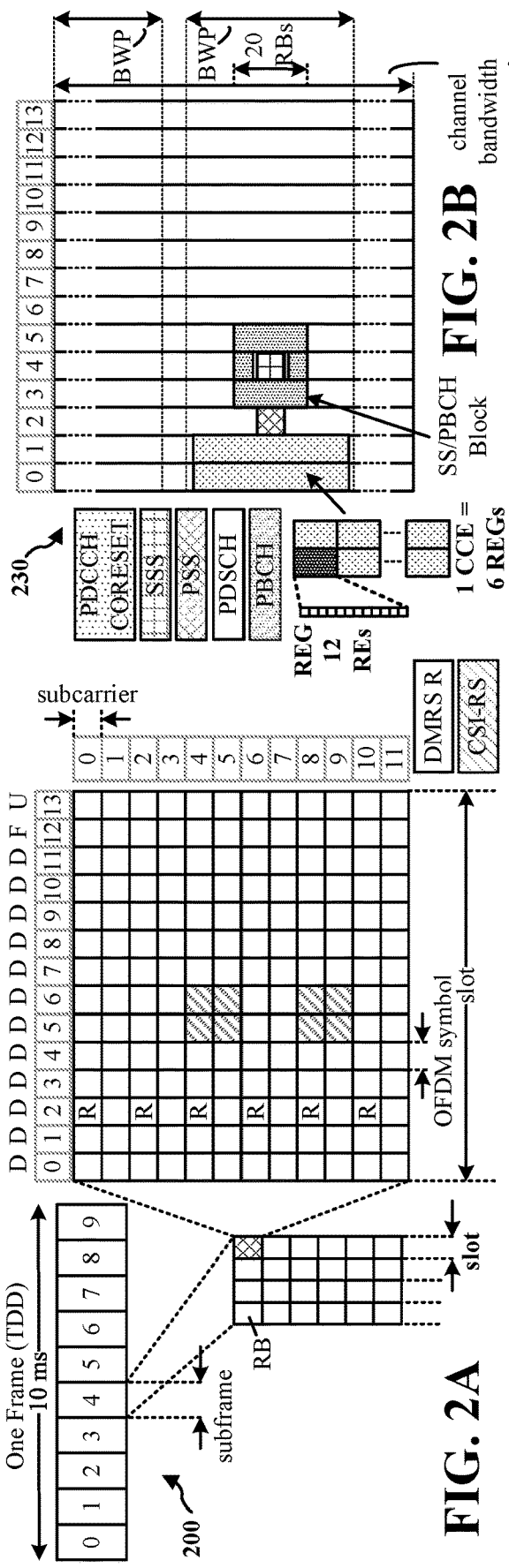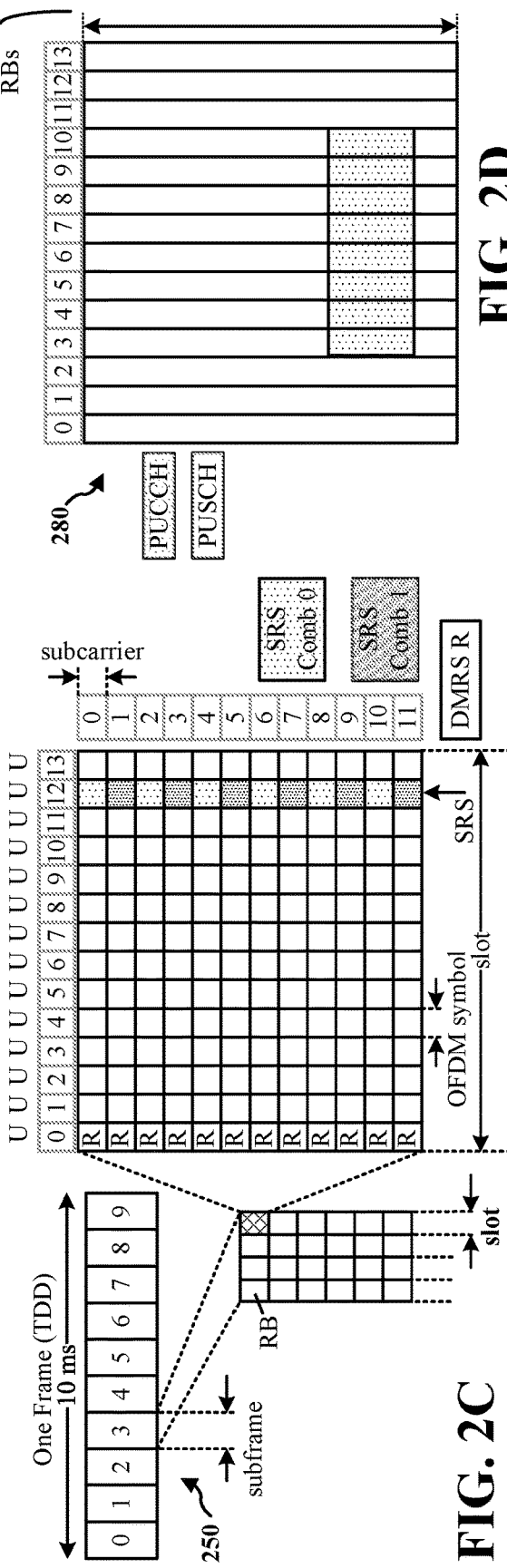

SECURITY HANDLING OF 5GS TO EPC RESELECTION

CROSS REFERENCE TO RELATED APPLICATION(S)

This application claims the benefit of and priority to U.S. Provisional Application Ser. No. 63/187,784, entitled "SECURITY HANDLING OF 5GS TO EPC RESELECTION," and filed on May 12, 2021, which is expressly incorporated by reference herein in its entirety.

TECHNICAL FIELD

The present disclosure relates generally to communication systems, and more particularly, to security features and security mechanisms employed in communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a user equipment (UE). The example apparatus may transmit, to a first network entity, a first tracking area update (TAU) request, the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity. The example apparatus may also transmit, to the first network entity, a second TAU request, the second TAU request including the first set of information, the second TAU request being integrity protected using a second uplink count. The example apparatus may also derive a mapped security context based on the first security context and at least one of the first uplink count or the second uplink count. Additionally, the example apparatus may communicate with the first network entity based on the mapped security context.

In an aspect of the disclosure, a method, a computer-readable medium, and an apparatus are provided for wireless communication. An apparatus may include a UE. The example apparatus may transmit, to a first network entity, a first TAU request when performing a change from a first cell associated with a first RAT to connect to a second cell associated with a second RAT different than the first RAT, the first network entity associated with the second RAT, the first TAU request encoded using a first security context associated with the first RAT, and the first TAU request being integrity protected using a first uplink count based on the first security context. The example apparatus may also derive a first integrity key based on the first security context, the first uplink count, and a first mapped security context. Additionally, the example apparatus may transmit to the first network entity, a repetition of the first TAU request, the repetition of the first TAU request being integrity protected using a second uplink count that is different than the first uplink count. The example apparatus may also derive a second integrity key based on the first security context, the second uplink count, and a second mapped security context. The example apparatus may also receive, from the first network entity, a downlink transmission. Additionally, the example apparatus may perform an integrity check on the downlink transmission using at least one of the first integrity key and the second integrity key. The example apparatus may also set a master security key of the UE when the integrity check on the downlink transmission is successful using a derived integrity key, the master security key being set based on the first mapped security context or the second mapped security context used to derive the derived integrity key.

In another aspect of the disclosure, a method, a computer-readable medium, and an apparatus are provided for wireless communication. An apparatus may include a first network entity, such as a Mobility Management Entity (MME). The example apparatus may receive a first TAU request generated by a UE, the first TAU request encoded using a first security context associated with a first RAT, the first TAU request being integrity protected using a first uplink count based on the first security context, and the first TAU request including a first set of information including an identifier mapped to a second RAT associated with the first network entity. The example apparatus may also output, based on the first TAU request, a first context request for a second network entity, the second network entity associated with the first RAT. Additionally, the example apparatus may receive, based on the first context request, a first mapped security context, the first mapped security context derived from the first security context and the first uplink count. The example apparatus may also receive a second TAU request, the second TAU request encoded using the first security context, the second TAU request being integrity protected using a second uplink count that is different than the first uplink count, and the second TAU request including the first set of information. The example apparatus may also output, based on the second TAU request, a second context request for the second network entity. The example apparatus may also receive, based on the second context request, a second mapped security context, the second mapped security context derived from the first security context and the second uplink count. Additionally, the example apparatus may transmit a downlink message based on the second mapped security context.

In another aspect of the disclosure, a method, a computer-readable medium, and an apparatus are provided for wireless communication. An apparatus may include a second network entity, such as an Access and Mobility Management Function (AMF). The example apparatus may receive a first context request, the first context request including at least a first TAU request generated by a UE, the first TAU request being integrity protected using a first uplink count, the first TAU request encoded using a first security context associated with a first RAT, the first RAT different than a second RAT associated with a first network entity. The example apparatus may also derive a first mapped security context when a first integrity check on the first TAU request is successful. The example output the first mapped security context for the first network entity. Additionally, the example apparatus may receive a second context request, the second context request including at least a second TAU request generated by the UE, the second TAU request being integrity protected using a second uplink count different than the first uplink count. The example apparatus may also derive a second mapped security context when a second integrity check on the second TAU request is successful. Additionally, the example apparatus may output the second mapped security context for the first network entity.

In an aspect of the disclosure, a method, a computer-readable medium, and an apparatus are provided for wireless communication at a first network entity, such as an MME. An example apparatus may receive, from a UE, a first TAU request, the first TAU request encoded using a first security context associated with a first RAT, the first TAU request being integrity protected using a first uplink count based on the first security context, and the first TAU request including a first set of information including an identifier mapped to a second RAT associated with the first network entity. The example apparatus may also transmit, to a second network entity based on the first TAU request, a first context request, the second network entity associated with the first RAT. Additionally, the example apparatus may receive, from the second network entity based on the first context request, a first mapped security context, the first mapped security context derived from the first security context and the first uplink count. Further, the example apparatus may receive, from the UE, a second TAU request, the second TAU request encoded using the first security context, the second TAU request being integrity protected using a second uplink count different than the first uplink count, and the second TAU request including the first set of information. The example apparatus may also transmit, to the second network entity based on the second TAU request, a second context request. The example apparatus may also receive, from the second network entity based on the second context request, a second mapped security context, the second mapped security context derived from the first security context and the second uplink count. Additionally, the example apparatus may transmit, to the UE, a downlink message based on the second mapped security context.

In another aspect of the disclosure, a method, a computer-readable medium, and an apparatus are provided for wireless communication at a second network entity, such as an AMF. An example apparatus may receive, from a first network entity, a first context request, the first context request including at least a first TAU request generated by a UE, the first TAU request being integrity protected using a first uplink count, the first TAU request encoded using a first security context associated with a first RAT, the first RAT different than a second RAT associated with the first network entity. The example apparatus may also derive a first mapped security context when an integrity check on the first TAU request is successful. Additionally, the example apparatus may transmit, to the first network entity, the first mapped security context. The example apparatus may also receive, from the first network entity, a second context request, the second context request including at least a second TAU request generated by the UE, the second TAU request being integrity protected using a second uplink count different than the first uplink count. Additionally, the example apparatus may derive a second mapped security context when an integrity check on the second TAU request is successful. The example apparatus may also transmit, to the first network entity, the second mapped security context.

In another aspect of the disclosure, a method, a computer-readable medium, and an apparatus are provided for wireless communication at a UE. An example apparatus may transmit, to a first network entity, a first TAU request, the first TAU request encoded using a first security context associated with a first RAT, the first TAU request being integrity protected using a first uplink count based on the first security context, and the first TAU request including a first set of information including an identifier mapped to a second RAT associated with the first network entity. The example apparatus may also derive a first mapped security context based on the first security context and the first uplink count. Additionally, the example apparatus may transmit, to the first network entity, a second TAU request, the second TAU request encoded using the first security context, the second TAU request being integrity protected using a second uplink count different than the first uplink count, and the second TAU request including the first set of information. The example apparatus may also derive a second mapped security context based on the first security context and the second uplink count. Additionally, the example apparatus may communicate with the first network entity based on the second mapped security context.

In another aspect of the disclosure, a method, a computer-readable medium, and an apparatus are provided for wireless communication at a UE. An example apparatus may transmit, to a first network entity, a first TAU request when performing a change from a first cell associated with a first RAT to connect to a second cell associated with a second RAT different than the first RAT, the first network entity associated with the second RAT, the first TAU request encoded using a first security context associated with the first RAT, the first TAU request being integrity protected using a first uplink count based on the first security context, the first TAU request including a first set of information including an identifier mapped to a second RAT associated with the first network entity. The example apparatus may also transmit, to the first network entity, a repetition of the first TAU request, the repetition of the first TAU request including the first set of information, the repetition of the first TAU request being integrity protected using the first uplink count. Additionally, the example apparatus may derive a mapped security context based on the first security context and the first uplink count. The example apparatus may also communicate with the first network entity based on the mapped security context.

In another aspect of the disclosure, a method, a computer-readable medium, and an apparatus are provided for wireless communication at a UE. An example apparatus may transmit, to a first network entity, a first TAU request when performing a change from a first cell associated with a first RAT to connect to a second cell associated with a second RAT different than the first RAT, the first network entity associated with the second RAT, the first TAU request encoded using a first security context associated with the first RAT, and the first TAU request being integrity protected using a first uplink count based on the first security context. The example apparatus may also derive a first integrity key based on the first security context, the first uplink count, and a first mapped security context. Additionally, the example apparatus may transmit, to the first network entity, a repetition of the first TAU request, the repetition of the first TAU request being integrity protected using a second uplink count different than the first uplink count. The example apparatus may also derive a second integrity key based on the first security context, the second uplink count, and a second mapped security context. Additionally, the example apparatus may receive, from the first network entity, a downlink transmission. The example apparatus may also perform an integrity check on the downlink transmission using at least one of the first integrity key and the second integrity key. Additionally, the example apparatus may set a master security key of the UE when the performing of the integrity check on the downlink transmission is successful using a derived integrity key, the master security key being set based on the respective integrity key.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
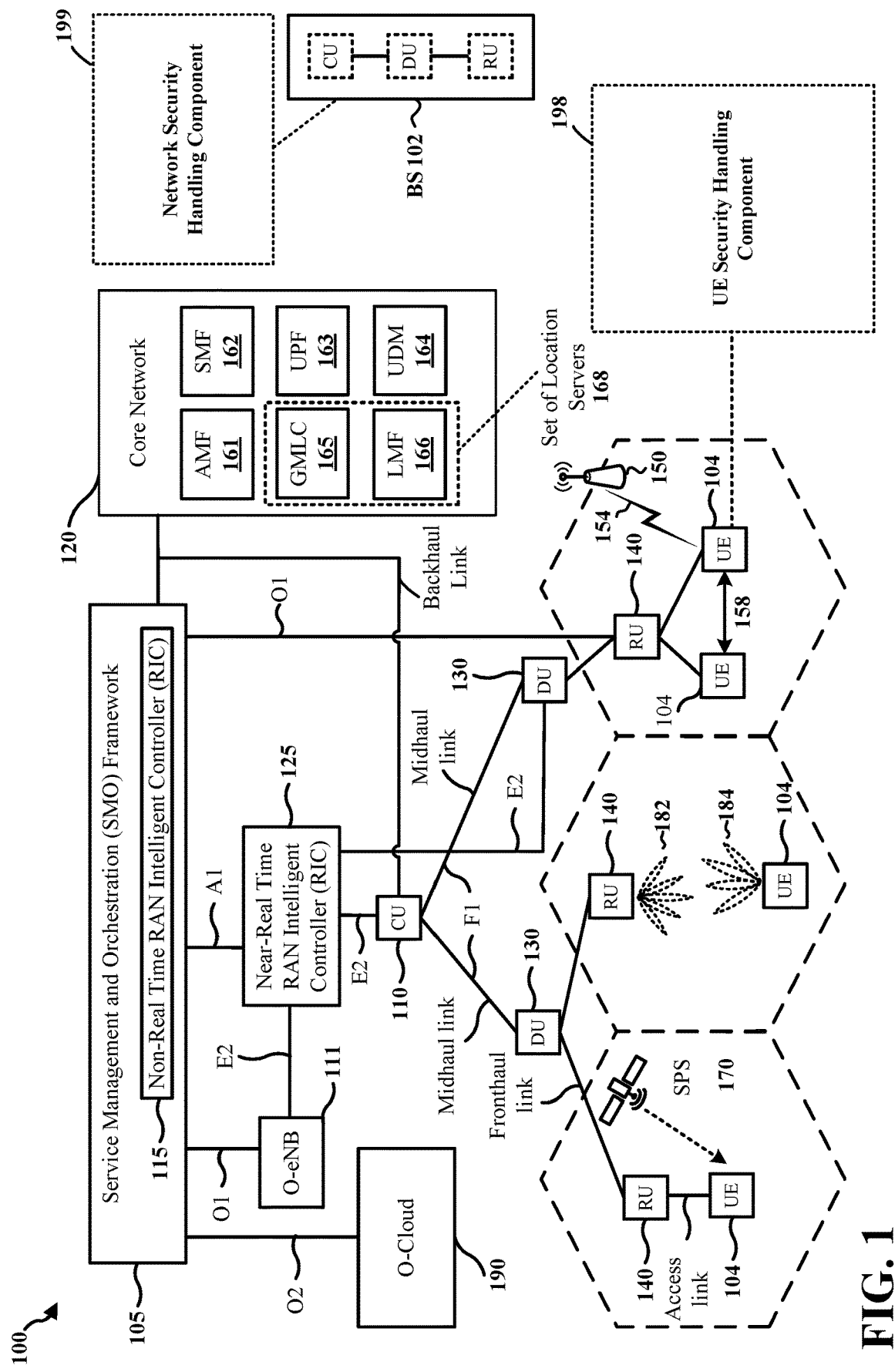
FIG. 1 is a diagram illustrating an example of a wireless communications system and an access network.

Any number of wireless networks may be deployed in a given geographic area. Each wireless network may support a particular radio access technology (RAT) and may operate on one or more frequencies. In some examples, a UE may be connected to a first cell associated with a first RAT, such as 5G. The first cell may be unable to provide support to the UE. For example, coverage of 5G may be non-ubiquitous in some deployment scenarios. In other examples, the first RAT may be unable to provide a service, such as voice over in which a voice over service is initiated over the first RAT. To provide support to the UE, the UE and the first RAT may support reselection from the first RAT to a second RAT that may provide support to the UE with respect to the service. For example, to support voice over support, the UE and the first cell may support a fallback procedure in which the UE falls back to a second cell associated with the second RAT.

When the UE falls back from the first cell to the second cell, the UE may perform a reselection procedure. For example, the UE may perform a 5G to Evolved Packet Core (EPC) reselection procedure. When the UE performs the reselection procedure, the UE may initiate a TAU procedure to register itself within a tracking area of the second cell and the associated second RAT.

To provide security of communications across wireless communication systems, messages exchanged between devices of the wireless communication systems may be integrity protected. The integrity protection may be based on a security context including one or more security keys. In some examples, the security context may include one or more security parameters for authentication, integrity protection, and ciphering, and may be identifiable by a key set identifier (KSI). In some examples, each RAT may be associated with a respective security context. To facilitate reselection from the first cell to the second cell, network entities of the respective RATs may facilitate mapping a first security context associated with one RAT to a second security context associated with another RAT. For example, a network entity associated with 5G may facilitate mapping a 5G security context to an EPC security context. In some examples, mapping the 5G security context to the EPC security context may include using the 5G security context to derive the EPC security context. The EPC security context may enable the UE to communicate with the second cell associated with the EPC network after switching from the first cell to the second cell.

In some scenarios, a radio link failure (RLF) may occur after the UE establishes a connection with the second cell and transmits a TAU request message. In such examples, the UE may retransmit the TAU request message. However, it may be possible that the mapping of the first security context to the second security context may result in an inconsistency, which may cause communication failure.

Examples disclosed herein provide techniques for removing inconsistencies in the handling of repetitions of TAU request messages as described above. In a first aspect, disclosed techniques may remove inconsistencies by modifying how the network handles a repetition of a TAU request message. In a second aspect, disclosed techniques may remove inconsistencies by modifying how the UE integrity protects the TAU request messages. In a third aspect, disclosed techniques may remove inconsistences by modifying how the UE performs integrity verification of messages.

The aspects presented herein may enable devices of a wireless communication system to facilitate security handling of 5GS to EPC reselection in cases of RLF and retransmission of Evolved Packet System (EPS) TAU requests facilitating improved mobility support.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC 115 associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUs (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station (e.g., the base station 102). The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a base station, such as the UE 104, may be configured to manage one or more aspects of wireless communication. For example, the UE 104 may include a UE security handling component 198 configured to facilitate security handling of 5GS to EPC reselection in cases of RLF and retransmission of EPS TAU requests. In certain aspects, the UE security handling component 198 may be configured to transmit, to a first network entity, a first TAU request, the first TAU request encoded using a first security context associated with a first RAT, the first TAU request being integrity protected using a first uplink count based on the first security context, and the first TAU request including a first set of information including an identifier mapped to a second RAT associated with the first network entity. An uplink count may indicate a quantity of communicated uplink messages. The example UE security handling component 198 may also be configured to transmit, to the first network entity, a second TAU request, the second TAU request including the first set of information, the second TAU request being integrity protected using a second uplink count. Additionally, the example UE security handling component 198 may be configured to derive a mapped security context based on the first security context and at least one of the first uplink count or the second uplink count. The example UE security handling component 198 may also be configured to communicate with the first network entity based on the mapped security context.

In another aspect, the UE security handling component 198 may be configured to transmit, to a first network entity, a first TAU request when performing a change from a first cell associated with a first RAT to connect to a second cell associated with a second RAT different than the first RAT, the first network entity associated with the second RAT, the first TAU request encoded using a first security context associated with the first RAT, and the first TAU request being integrity protected using a first uplink count based on the first security context. The example UE security handling component 198 may also be configured to derive a first integrity key based on the first security context, the first uplink count, and a first mapped security context. The integrity key may be a key used to perform an integrity check on a communication. Additionally, the example UE security handling component 198 may be configured to transmit, to the first network entity, a repetition of the first TAU request, the repetition of the first TAU request being integrity protected using a second uplink count that is different than the first uplink count. The example UE security handling component 198 may also be configured to derive a second integrity key based on the first security context, the second uplink count, and a second mapped security context. Additionally, the example UE security handling component 198 may be configured to receive, from the first network entity, a downlink transmission. The example UE security handling component 198 may also be configured to perform an integrity check on the downlink transmission using at least one of the first integrity key and the second integrity key. The integrity check may be performed using an integrity key and confirm the integrity of the downlink transmission. Additionally, the example UE security handling component 198 may be configured to set a master security key of the UE when the integrity check on the downlink transmission is successful using a derived integrity key, the master security key being set based on the first mapped security context or the second mapped security context used to derive the derived integrity key. The master security key may be a key used to derive other security keys.

In certain aspects, the UE security handling component 198 may be configured to transmit, to a first network entity, a first TAU request. The first TAU request may be encoded using a first security context associated with a first RAT. The first TAU request may be integrity protected using a first uplink count based on the first security context, and the first TAU request may include a first set of information including an identifier mapped to a second RAT associated with the first network entity. The example UE security handling component 198 may also be configured to derive a first mapped security context based on the first security context and the first uplink count. The example UE security handling component 198 may also be configured to transmit, to the first network entity, a second TAU request. The second TAU request may be encoded using the first security context, the second TAU request may be integrity protected using a second uplink count different than the first uplink count, and the second TAU request may include the first set of information. The example UE security handling component 198 may also be configured to derive a second mapped security context based on the first security context and the second uplink count. The example UE security handling component 198 may also be configured to communicate with the first network entity based on the second mapped security context.

In another aspect, the UE security handling component 198 may be configured to transmit, to a first network entity, a first TAU request when performing a change from a first cell associated with a first RAT to connect to a second cell associated with a second RAT different than the first RAT. The first network entity may be associated with the second RAT. The first TAU request may be encoded using a first security context associated with the first RAT, the first TAU request may be integrity protected using a first uplink count based on the first security context, and the first TAU request may include a first set of information including an identifier mapped to a second RAT associated with the first network entity.

The example UE security handling component 198 may also be configured to transmit, to the first network entity, a repetition of the first TAU request. The repetition of the first TAU request may include the first set of information, the repetition of the first TAU request may be integrity protected using the first uplink count. The example UE security handling component 198 may also be configured to derive a mapped security context based on the first security context and the first uplink count. Additionally, the example UE security handling component 198 may be configured to communicate with the first network entity based on the mapped security context.

In another aspect, the UE security handling component 198 may be configured to transmit, to a first network entity, a first TAU request when performing a change from a first cell associated with a first RAT to connect to a second cell associated with a second RAT different than the first RAT. The first network entity may be associated with the second RAT. The first TAU request may be encoded using a first security context associated with the first RAT, and the first TAU request may be integrity protected using a first uplink count based on the first security context. The example UE security handling component 198 may also be configured to derive a first integrity key based on the first security context, the first uplink count, and a first mapped security context. The example UE security handling component 198 may also be configured to transmit, to the first network entity, a repetition of the first TAU request. The repetition of the first TAU request may be integrity protected using a second uplink count different than the first uplink count. Additionally, the example UE security handling component 198 may also be configured to derive a second integrity key based on the first security context, the second uplink count, and a second mapped security context. The example UE security handling component 198 may also be configured to receive, from the first network entity, a downlink transmission. The example UE security handling component 198 may also be configured to perform an integrity check on the downlink transmission using at least one of the first integrity key and the second integrity key. The example UE security handling component 198 may also be configured to set a master security key of the UE when the performing of the integrity check on the downlink transmission is successful using a derived integrity key. The master security key being set based on the respective integrity key.

In another configuration, a network entity may be configured to manage one or more aspects of wireless communication by facilitating security handling of 5GS to EPC reselection in cases of RLF and retransmission of EPS TAU requests facilitating improved mobility support. For example, a network entity may include a network security handling component 199. Aspects of the network security handling component 199 may be implemented by an MME, an AMF (e.g., the AMF 161), and/or a base station (e.g., the base station 102).

The network security handling component 199 may be configured to receive a first TAU request generated by a UE, the first TAU request encoded using a first security context associated with a first RAT, the first TAU request being integrity protected using a first uplink count based on the first security context, and the first TAU request including a first set of information including an identifier mapped to a second RAT associated with the first network entity. Additionally, the network security handling component 199 may be configured to output, based on the first TAU request, a first context request for a second network entity, the second network entity associated with the first RAT. The network security handling component 199 may also be configured to receive, based on the first context request, a first mapped security context, the first mapped security context derived from the first security context and the first uplink count. Additionally, the network security handling component 199 may be configured to receive a second TAU request, the second TAU request encoded using the first security context, the second TAU request being integrity protected using a second uplink count that is different than the first uplink count, and the second TAU request including the first set of information. The network security handling component 199 may also be configured to output, based on the second TAU request, a second context request for the second network entity. Additionally, the network security handling component 199 may be configured to receive, based on the second context request, a second mapped security context, the second mapped security context derived from the first security context and the second uplink count. The network security handling component 199 may also be configured to transmit a downlink message based on the second mapped security context.

In another aspect, the network security handling component 199 may be configured to receive a first context request, the first context request including at least a first TAU request generated by a UE, the first TAU request being integrity protected using a first uplink count, the first TAU request encoded using a first security context associated with a first RAT, the first RAT different than a second RAT associated with a first network entity. Additionally, the network security handling component 199 may be configured to derive a first mapped security context when a first integrity check on the first TAU request is successful. The network security handling component 199 may also be configured to output the first mapped security context for the first network entity. Additionally, the network security handling component 199 may be configured to receive a second context request, the second context request including at least a second TAU request generated by the UE, the second TAU request being integrity protected using a second uplink count different than the first uplink count. The network security handling component 199 may also be configured to derive a second mapped security context when a second integrity check on the second TAU request is successful. Additionally, the network security handling component 199 may be configured to output the second mapped security context for the first network entity.

In certain aspects, the network security handling component 199 may be configured to receive, from a UE, a first TAU request. The first TAU request may be encoded using a first security context associated with a first RAT, the first TAU request may be integrity protected using a first uplink count based on the first security context, and the first TAU request may include a first set of information including an identifier mapped to a second RAT associated with the first network entity. The example network security handling component 199 may also be configured to transmit, to a second network entity based on the first TAU request, a first context request. The second network entity may be associated with the first RAT. The example network security handling component 199 may also be configured to receive, from the second network entity based on the first context request, a first mapped security context. The first mapped security context may be derived from the first security context and the first uplink count. Additionally, the example network security handling component 199 may be configured to receive, from the UE, a second TAU request. The second TAU request may be encoded using the first security context, the second TAU request may be integrity protected using a second uplink count different than the first uplink count, and the second TAU request may include the first set of information. The example network security handling component 199 may also be configured to transmit, to the second network entity based on the second TAU request, a second context request. Additionally, example network security handling component 199 may be configured to receive, from the second network entity based on the second context request, a second mapped security context. The second mapped security context may be derived from the first security context and the second uplink count. The example network security handling component 199 may also be configured to transmit, to the UE, a downlink message based on the second mapped security context.

In another aspect, the network security handling component 199 may be configured to receive, from a first network entity, a first context request, the first context request including at least a first TAU request generated by a UE. The first TAU request may be integrity protected using a first uplink count, the first TAU request may be encoded using a first security context associated with a first RAT, the first RAT may be different than a second RAT associated with the first network entity. The example network security handling component 199 may also be configured to derive a first mapped security context when an integrity check on the first TAU request is successful. The example network security handling component 199 may also be configured to transmit, to the first network entity, the first mapped security context. Additionally, the example network security handling component 199 may be configured to receive, from the first network entity, a second context request. The second context request may include at least a second TAU request generated by the UE, the second TAU request being integrity protected using a second uplink count different than the first uplink count. The example network security handling component 199 may also be configured to derive a second mapped security context when an integrity check on the second TAU request is successful. The example network security handling component 199 may also be configured to transmit, to the first network entity, the second mapped security context.

The aspects presented herein may enable devices of a wireless communication system to facilitate security handling of 5GS to EPC reselection in cases of RLF and retransmission of EPS TAU requests facilitating improved mobility support.

Although the following description provides examples directed to 5G NR (and, in particular, to 5G to EPC reselection), the concepts described herein may be applicable to other similar areas, such as LTE, LTE-A, CDMA, GSM, and/or other wireless technologies, in which a UE may perform reselection from a cell associated with a first RAT to a second associated with a second RAT.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. As shown in Table 1, the subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
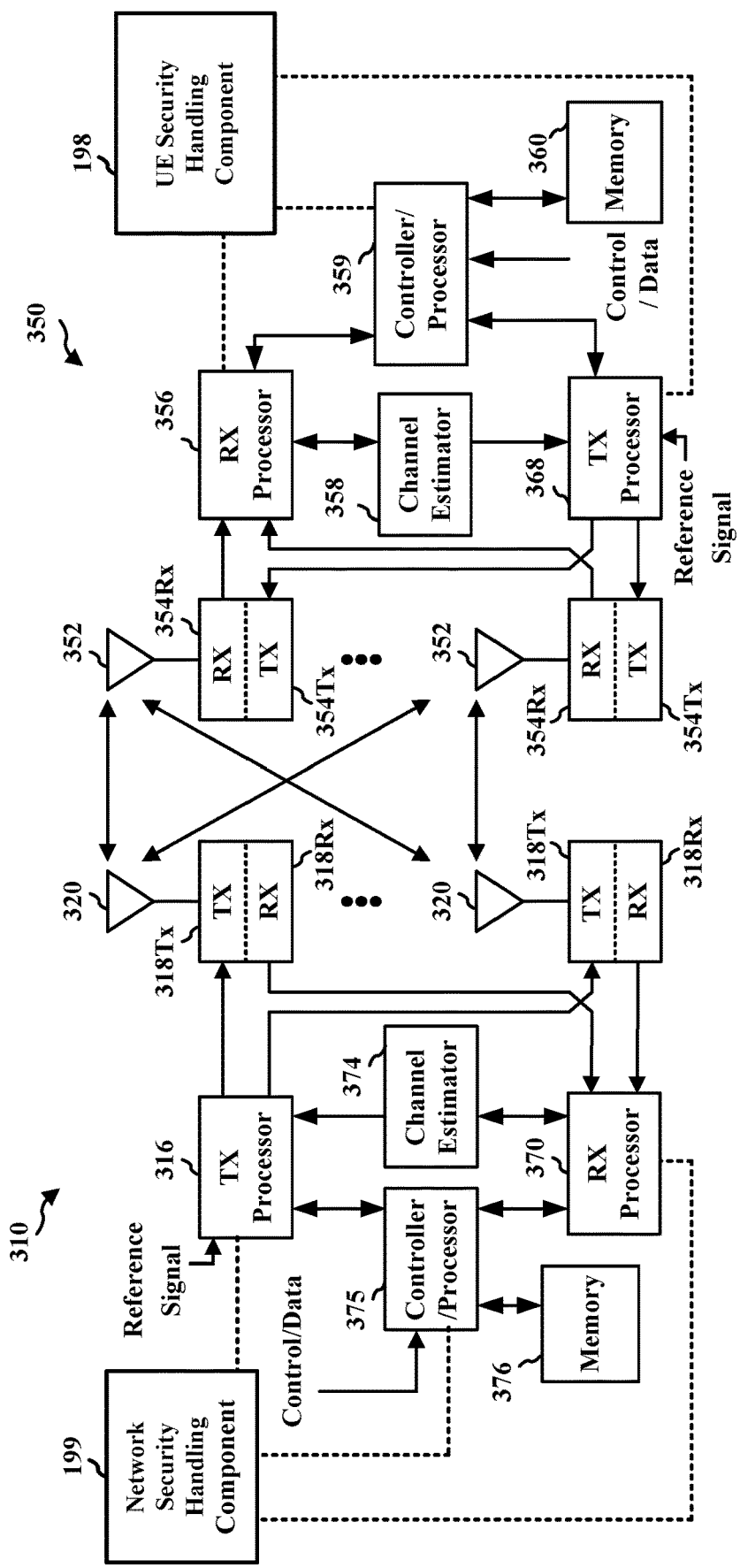
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE security handling component 198 of FIG. 1.

At least one of the TX processor 316, the RX processor 370, and the controller/processor 375 may be configured to perform aspects in connection with the network security handling component 199 of FIG. 1.

Figure 4:
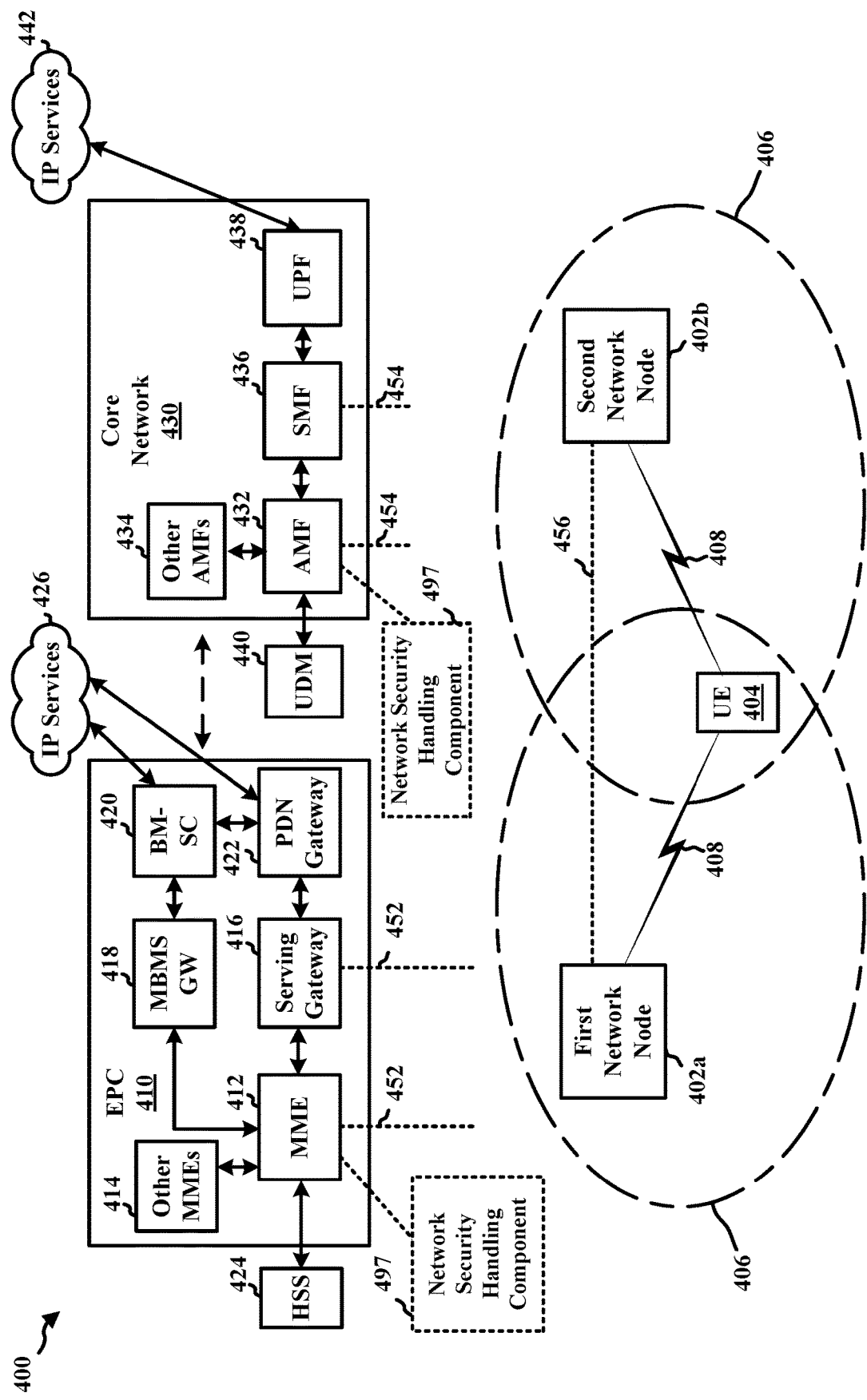
FIG. 4 is a diagram illustrating an example of a wireless communications system and an access network including a first network node, a second network node, a UE, an Evolved Packet Core (EPC), and a core network (e.g., a 5G Core (5GC)), in accordance with the teachings disclosed herein.

FIG. 4 is a diagram illustrating an example of a wireless communications system and an access network 400 including a first network node 402a, a second network node 402b, a UE 404, an Evolved Packet Core (e.g., an EPC 410), and a core network 430 (e.g., a 5G Core (5GC)), as presented herein. Aspects of the first network node 402a and/or the second network node 402b, which may be collectively referred to herein as "network nodes 402a/402b," may be implemented by the base station 102 of FIG. 1 and/or a component of the base station 102, such as a CU 110, a DU 130, and/or an RU 140. Aspects of the UE 404 may be implemented by the UE 104 of FIG. 1.

In the example of FIG. 4, the first network node 402a may be configured for 4G LTE (collectively referred to as Evolved Universal Mobile Telecommunications System (UMTS) Terrestrial Radio Access Network (E-UTRAN)) and may interface with the EPC 410 through first backhaul links 452 (e.g., S1 interface). The second network node 402b may be configured for 5G NR (collectively referred to as Next Generation RAN (NG-RAN)) and may interface with the core network 430 through second backhaul links 454. In addition to other functions, the network nodes 402a/402b may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network nodes 402a/402b may communicate directly or indirectly (e.g., through the EPC 410 or the core network 430) with each other over third backhaul links 456 (e.g., X2 interface). The first backhaul links 452, the second backhaul links 454, and the third backhaul links 456 may be wired or wireless.

The network nodes 402a/402b may wirelessly communicate with the UE 404. Each of the network nodes 402a/402b may provide communication coverage for a respective geographic coverage area 406. There may be overlapping geographic coverage areas. In the example of FIG. 4, communication links 408 between the network nodes 402a/402b and the UE 404 may include uplink (UL) (also referred to as reverse link) transmissions from UE 404 to a respective network node and/or downlink (DL) (also referred to as forward link) transmissions from a respective network node to UE 404. The communication links 408 may use MIMO antenna technology, including spatial multiplexing, beamforming, and/or transmit diversity. The communication links may be through one or more carriers.

The EPC 410 may include a Mobility Management Entity (e.g., an MME 412), other MMEs 414, a Serving Gateway 416, a Multimedia Broadcast Multicast Service (MBMS) Gateway (e.g., an MBMS GW 418), a Broadcast Multicast Service Center (e.g., a BM-SC 420), and a Packet Data Network (PDN) Gateway (e.g., a PDN Gateway 422). The MME 412 may be in communication with a Home Subscriber Server (e.g., an HSS 424). The MME 412 is the control node that processes the signaling between the UE 404 and the EPC 410. Generally, the MME 412 provides bearer and connection management. All user Internet protocol (IP) packets are transferred through the Serving Gateway 416, which itself is connected to the PDN Gateway 422. The PDN Gateway 422 provides UE IP address allocation as well as other functions. The PDN Gateway 422 and the BM-SC 420 are connected to IP Services 426. The IP Services 426 may include the Internet, an intranet, an IP Multimedia Subsystem (IMS), a PS Streaming Service, and/or other IP services. The BM-SC 420 may provide functions for MBMS user service provisioning and delivery. The BM-SC 420 may serve as an entry point for content provider MBMS transmission, may be used to authorize and initiate MBMS Bearer Services within a public land mobile network (PLMN), and may be used to schedule MBMS transmissions. The MBMS GW 418 may be used to distribute MBMS traffic to the network nodes 402a/402b belonging to a Multicast Broadcast Single Frequency Network (MBSFN) area broadcasting a particular service, and may be responsible for session management (start/stop) and for collecting eMBMS related charging information.

The core network 430 may include an Access and Mobility Management Function (e.g., an AMF 432), other AMFs 434, a Session Management Function (e.g., an SMF 436), and a User Plane Function (e.g., a UPF 438). The AMF 432 may be in communication with a Unified Data Management (e.g., a UDM 440). The AMF 432 is the control node that processes the signaling between the UE 404 and the core network 430. Generally, the AMF 432 provides QoS flow and session management. All user IP packets are transferred through the UPF 438. The UPF 438 provides UE IP address allocation as well as other functions. The UPF 438 is connected to IP Services 442. The IP Services 442 may include the Internet, an intranet, an IP Multimedia Subsystem (IMS), a Packet Switch (PS) Streaming (PSS) Service, and/or other IP services.

In the example of FIG. 4, the MME 412 and/or the AMF 432 may be configured to manage one or more aspects of wireless communication by facilitating security handling of 5GS to EPC reselection in cases of RLF and retransmission of EPS TAU requests facilitating improved mobility support. For examples, the MME 412 and/or the AMF 432 may be configured to facilitate a handover from the 5G network associated with the second network node 402b to the EPS network associated with the first network node 402a. The MME 412 and/or the AMF 432 may include a network security handling component 497. Aspects of the network security handling component 497 may be similar to the network security handling component 199 of FIG. 1 and/or FIG. 3.

The non-access stratum (NAS) forms a highest stratum of the control plane between a UE and an MME at the radio interface. Protocols that are part of the NAS provide support of mobility of the UE. NAS security is an additional function of the NAS providing services to the NAS protocols. For example, NAS security may provide integrity protection and ciphering of NAS signaling messages.

The security parameters for authentication, integrity protection, and ciphering may be referred to as a security context and identified by a key set identifier (KSI). The information representing the security context may be stored at the UE and the network serving the UE (e.g., the serving network). With respect to communicating NAS signaling messages, the security context may be referred to as a "NAS security context" and include a key, a key set identifier associated with the key, UE security capabilities (e.g., a set of identifiers corresponding to the ciphering and integrity algorithms implemented by the UE), an uplink NAS count, and a downlink NAS count. When a security context is activated, the uplink NAS count and the downlink NAS count may each be set to zero, and may be sequentially incremented when a respective NAS message is communicated. Thus, the uplink NAS count value may indicate a quantity of communicated uplink NAS messages and the downlink NAS count value may indicate a quantity of communicated downlink NAS messages associated with an active security context.

When a UE is connected to a 5G network, the 5G security context may include a 5G NAS master security key ($K_{AMF}$) that is identified by a key set identifier in 5G (ngKSI). The 5G NAS master security key may also be referred to as a "5G NAS key" or a "5G master security key" herein. When the UE is connected to an EPS network, the EPS security context may include an EPS NAS master security key ($K_{ASME}$) that is identified by a key set identifier for EPS (eKSI). The EPS NAS master security key may also be referred to as an "EPS NAS key" or an "EPS master security key" herein.

Figure 5:
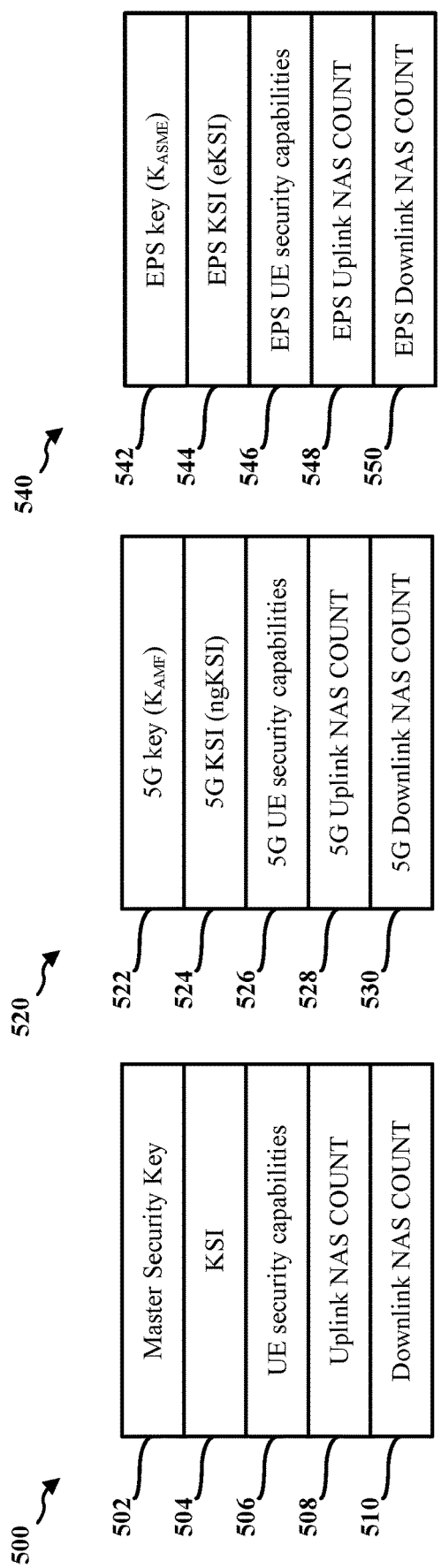
FIG. 5 depicts examples of different security contexts, in accordance with the teachings disclosed herein.

FIG. 5 depicts examples of different security contexts, as presented herein. For example, FIG. 5 includes a first security context 500, a second security context 520 associated with a 5G network, and a third security context 540 associated with an EPS network. The security contexts include data that may be used to integrity protect NAS signaling, e.g., when transmitting a NAS message and/or when receiving a NAS message. The security context data may be associated with integrity protecting NAS signaling associated with respective RANs. For example, the second security context 520 may include 5G security context data used to transmit 5G NAS messages and/or verify 5G NAS messages. The third security context 540 may include EPS security context data used to transmit EPS NAS messages and/or verify EPS NAS messages.

In the example of FIG. 5, the first security context 500 includes a master security key 502 and a KSI 504 associated with the master security key 502. For example, the KSI 504 may indicate the master security key 502. The first security context 500 also includes UE security capabilities 506 that may include a set of identifiers corresponding to the ciphering and integrity algorithms implemented by the UE. For example, the UE security capabilities 506 may include integrity and encryption keys and the associated identifiers of selected integrity and encryption algorithms. The first security context 500 also includes a NAS count pair including an uplink NAS count 508 and a downlink NAS count 510. The uplink NAS count 508 indicates a quantity of communicated uplink NAS messages and the downlink NAS count 510 indicates a quantity of communicated downlink NAS messages associated with an active security context. When a security context is activated, the uplink NAS count 508 and the downlink NAS count 510 may be set to a starting value (e.g., may be set to zero). After the NAS count values are set to the starting value, the NAS count value may be incremented when a respective NAS message is communicated.

As described above, the second security context 520 includes 5G security context data to facilitate integrity protecting 5G NAS messages. For example, the second security context 520 includes a 5G key 522 ($K_{AMF}$), a 5G KSI 524 (ngKSI), 5G UE security capabilities 526, a 5G uplink NAS count 528, and a 5G downlink NAS count 530. The 5G security context data of the second security context 520 may be similar to the security context data of the first security context 500, but may be configured for the 5G network.

The third security context 540 includes EPS security context data to facilitate integrity protecting EPS NAS messages. For example, the third security context 540 includes an EPS key 542 ($K_{ASME}$), an EPS KSI 544 (eKSI), EPS UE security capabilities 546, an EPS uplink NAS count 548, and an EPS downlink NAS count 550. The EPS security context data of the third security context 540 may be similar to the security context data of the first security context 500, but may be configured for the EPS network.

The security contexts may be associated with a state, such as a "current" state or a "non-current" state. A current security context is a security context that is activated. A non-current security context is a security context that is not the current one (e.g., a security context that is not activated). The security contexts may be associated with a type, such as a "native" type or a "mapped" type. A native security context includes a "full native" security context or a "partial native" security context. The security context may be of one type and one state at a time. However, the type of a particular security context may change over time. For example, a partial native security context may transform into a full native security context.

A native security context is a security context with a key (e.g., an EPS key $K_{ASME}$ or a 5G key $K_{AMF}$) that is created by a primary authentication procedure and that is identified by a native key set identifier (e.g., a native eKSI or a native ngKSI). For example, the primary authentication procedure may enable mutual authentication between the UE and a network and provide keying material that may be used between the UE and the network in subsequent security procedures. The UE and the network may perform the primary authentication procedure when the UE registers with the network and the native security context may be generated when the primary authentication procedure is successful. The UE may store a copy of the native security context and the network may store a copy of the native security context associated with the UE at a network entity, such as at an MME and/or an AMF.

The native security context may include a native KSI that identifies a native key. The native KSI may be derived during the primary authentication procedure and may make it possible for the UE and the network to identify a native security context without invoking an authentication procedure. Thus, the native KSI may allow re-use of a native security context during subsequent connection setups between the UE and the network without having to perform an authentication procedure.

A native security context may be a partial native security context or a full native security context. A partial native security context is a security context including a key (e.g., the 5G key 522 or the EPS key 542) with the associated key set identifier (e.g., the 5G KSI 524 or the EPS KSI 544), the UE security capabilities, and the NAS count pair (e.g., the uplink NAS count value and the downlink NAS count value). A partial native security context may be created by primary authentication and is in the "non-current" state. A full native security context is a security context that includes the security context data of the partial native security context and also includes the NAS integrity and encryption keys and the associated key set identifiers of the selected NAS integrity and encryption algorithms. A full native security context may be in the "current" state or the "non-current" state.

A mapped security context is a security context for which a key is derived from a key associated with a different RAN. For example, a mapped 5G security context includes a mapped 5G key ($K_{AMF}$) that is derived from EPS keys (e.g., the EPS key 542). A mapped EPS security context includes a mapped EPS key ($K_{ASME}$) that is derived from 5G keys (e.g., the 5G key 522).

The mapped security context may include a mapped KSI of a first network that is associated with a mapped key derived from a native key of a second network. For example, a mapped 5G security context includes a mapped 5G KSI that is associated with a mapped 5G key derived from an EPS key of an EPS network. The mapped KSI may be generated at the UE and the network when deriving the mapped key. Thus, the mapped KSI may indicate the use of a mapped key.

In some aspects, a security context mismatch may occur between a UE and a first network during, for example, reselection from a second network to the first network (e.g., 5GS to EPS reselection). The number of 5GS to EPS reselection procedures performed in a deployment may be high due to, for example, a non-ubiquitous coverage of 5G in deployment scenarios. Additionally, the 5G network may not initially support IP Multimedia Subsystem (IMS) voice calls. In such scenarios, a UE camped on a cell associated with the 5G network may be redirected to a cell associated with the EPS network, for example, to attempt to establish a voice call.

Figure 6:
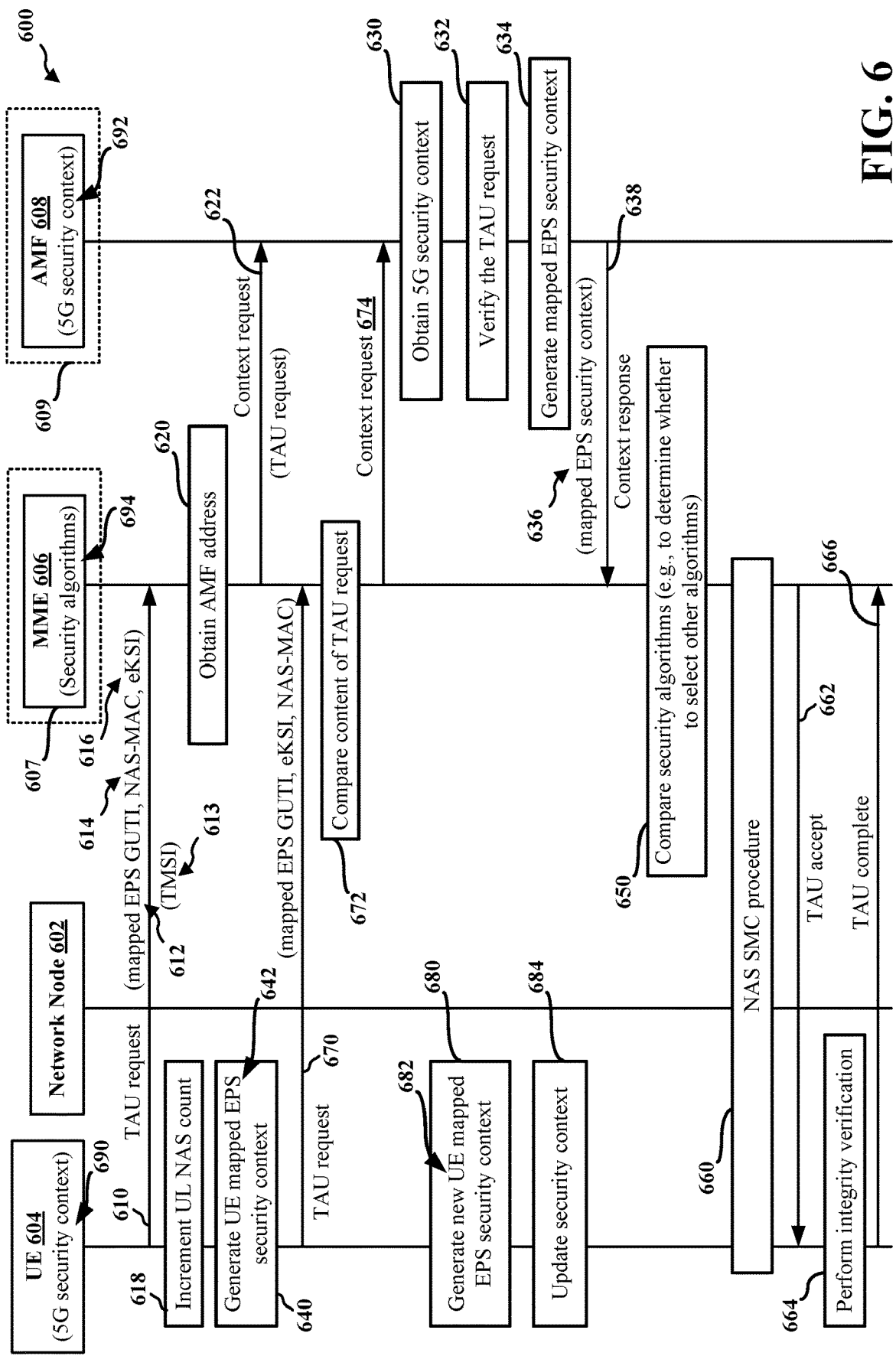
FIG. 6 is an example communication flow depicting idle mode mobility from a first RAT to a second RAT, in accordance with the teachings disclosed herein.

FIG. 6 illustrates an example communication flow 600 between a network node 602, a UE 604, an MME 606, and an AMF 608, as presented herein. In the illustrated example, the communication flow 600 facilitates performing idle mode mobility from 5GS to EPS. For example, the UE 604 may be connected to and/or camped on a first cell associated with a first RAT (e.g., a 5G network) and may be redirected to a second cell associated with a second RAT (e.g., an EPS network or an LTE network). In the example of FIG. 6, the MME 606 may be associated with an EPS network 607 and the AMF 608 may be associated with a 5G network 609. The example communication flow 600 may be associated with performing a tracking area update (TAU) request procedure after being redirected to the second cell (e.g., the EPS network 607) or an initial attach procedure with the second cell.

Aspects of the network node 602 may be implemented by the base station 102 of FIG. 1 and/or a component of the base station 102, such as a CU, a DU, and/or an RU. Aspects of the UE 604 may be implemented by the UE 104 of FIG. 1. Aspects of the MME 606 may be implemented by the MME 412 of FIG. 4. Aspects of the AMF 608 may be implemented by the AMF 161 of FIG. 1, the AMF 432 and/or the other AMFs 434 of FIG. 4. In the example of FIG. 6, the UE 604 communicates with the MME 606 via the network node 602. For example, the UE 604 may transmit an uplink message that is received by the network node 602, which then forwards the uplink message to the MME 606. In the downlink direction, the MME 606 may transmit a message that is received by the network node 602 and then forwarded by the network node 602 to the UE 604.

In the example of FIG. 6, the UE 604 is performing a reselection from the 5G network 609 to the EPS network 607. Thus, the UE 604 is configured with a 5G security context 690, such as the second security context 520 of FIG. 5, that is a current (or active) 5G security context. The UE 604 may derive a mapped EPS security context based on the 5G security context data of the current 5G security context to facilitate communication with the MME 606 and the EPS network 607.

As shown in FIG. 6, the UE 604 transmits a first TAU request message 610 that is received by the MME 606. The UE 604 may transmit the first TAU request message 610 to update the registration of the actual tracking area of the UE 604 in the EPS network 607. The UE 604 may transmit the first TAU request message 610 via an EPS NAS message. Thus, the first TAU request message 610 may include parameters associated with the EPS network 607.

For example, the first TAU request message 610 includes a mapped EPS Globally Unique Temporary UE Identity (e.g., a mapped EPS GUTI 612) and EPS security capabilities of the UE 604, such as the EPS UE security capabilities 546 of FIG. 5. The mapped EPS GUTI 612 may be derived from a 5G GUTI. The UE 604 may be configured with the 5G GUTI when registering with the 5G network 609. The 5G GUTI may point to an AMF where the 5G key associated with the UE 604 is stored. Thus, the mapped EPS GUTI 612 may contain information of the AMF that has the latest security context of the UE 604 in the 5G network 609 and an identifier of the UE within the AMF. For example, the mapped EPS GUTI 612 may contain an address associated with the AMF 608 and a Temporary Mobile Subscription Identifier (e.g., a TMSI 613) associated with the UE 604.

The UE 604 may integrity protect the first TAU request message 610 using the 5G security context 690 identified by the 5G GUTI used to derive the mapped EPS GUTI 612. For example, the UE 604 may compute a NAS Message Authentication Code (e.g., a NAS-MAC 614) for the first TAU request message 610. The UE 604 may compute the NAS-MAC 614 similar to computing a NAS-MAC for a 5G NAS message. The uplink NAS count for integrity protection of the first TAU request message 610 may be a same value as the 5G uplink NAS count (e.g., a same value as the 5G uplink NAS count 528 of FIG. 5). As a result, the uplink NAS count value across the communication system is increased. The first TAU request message 610 may include an eKSI parameter 616 and the UE 604 may include the 5G KSI (ngKSI) corresponding to the 5G security context 690 in the eKSI parameter 616.

In the example of FIG. 6, after transmitting the first TAU request message 610, the UE 604 may increment, at 618, the 5G uplink NAS count of the 5G security context 690 by one.

At 620, the MME 606 may obtain the AMF address of the AMF storing the 5G security context associated with the UE 604. For example, the MME 606 may use the mapped EPS GUTI 612 of the first TAU request message 610 to obtain the AMF address of the AMF 608.

As shown in FIG. 6, the MME 606 may transmit a context request message 622 that is received by the AMF 608. The context request message 622 may include all of the information or a portion of the information of the first TAU request message 610. For example, the context request message 622 may include the NAS-MAC 614 and the eKSI parameter 616. The context request message 622 may also include the mapped EPS GUTI 612.

At 630, the AMF 608 may identify a 5G NAS security context 692 associated with the UE 604, for example, based on the context request message 622. The AMF 608 may use the 5G KSI included in the eKSI parameter 616 of the context request message 622 to identify the 5G NAS security context 692 associated with the UE 604.

At 632, the AMF 608 may use the 5G NAS security context 692 to verify the first TAU request message 610. The AMF 608 may verify the first TAU request message 610 as if the first TAU request message 610 was a 5G NAS message. If the AMF 608 successfully verifies the first TAU request message 610, the AMF 608 may generate, at 634, a mapped EPS security context 636. For example, the AMF 608 may derive the mapped EPS security context 636 using the 5G NAS security context 692. The AMF 608 may derive the mapped EPS security context 636, for example, by deriving a mapped EPS key ($K_{ASME}'$) from the 5G key ($K_{AMF}$) using the 5G uplink NAS count derived from the first TAU request message 610. For example, the UE 604 may use the 5G uplink NAS count to integrity protect the first TAU request message 610. When the AMF 608 identifies the 5G NAS security context 692 of the UE 604 and verifies the first TAU request message 610, the AMF 608 may have the ability to determine the 5G uplink NAS count.

The AMF 608 may determine the mapped EPS KSI (eKSI) for the mapped EPS key ($K_{ASME}'$) based on the value taken from the 5G KSI (ngKSI) of the context request message 622. The EPS uplink and downlink NAS count values in the mapped EPS security context 636 may be set to the uplink and downlink NAS count values of the 5G NAS security context 692, respectively. The AMF 608 may set the EPS NAS algorithms to ones previously indicated to the UE 604 (e.g., during a connection establishment procedure or a connection reestablishment procedure).

As shown in FIG. 6, the AMF 608 may output a context response message 638 that is received by the MME 606. The context response message 638 may include the mapped EPS security context 636. In some examples, the AMF 608 may discard (or erase) the 5G NAS security context 692 used to derive the mapped EPS security context 636 after transmitting the context response message 638. In some examples, the AMF 608 may initiate a timer after transmitting the context response message 638 and discard the 5G NAS security context 692 after the timer expires.

In the illustrated example of FIG. 6, the UE 604 may generate, at 640, UE mapped EPS security context 642. For example, the UE 604 may derive the UE mapped EPS security context 642 in a manner similar to the AMF 608 deriving the mapped EPS security context 636. The UE 604 may set the EPS NAS algorithms to ones previously received from the AMF 608 (e.g., during a connection establishment procedure or a connection reestablishment procedure). The UE 604 may activate the UE mapped EPS security context 642 to use for processing of EPS NAS messages received from the MME 606.

At 650, the MME 606 may compare the UE security algorithms to security algorithms information 694. The MME 606 may be configured with the security algorithms information 694 via network management. The security algorithms information 694 may include a list of algorithms that are allowed for usage. The algorithms in the security algorithms information 694 may be ordered according to priority. The MME 606 may compare the EPS NAS algorithms included in the mapped EPS security context 636 of the context response message 638 to the security algorithms information 694. The MME 606 may compare, at 650, the security algorithms to determine whether to select another EPS NAS algorithm. If the MME 606 determines to perform an algorithm change, the MME 606 may select an EPS NAS algorithm from the security algorithms information 694 with the highest priority and that is also available to the UE 604. For example, the MME 606 may use the UE security capabilities of the UE, such as the EPS UE security capabilities 546 of FIG. 5, to determine which EPS NAS algorithm to select from the security algorithms information 694.

If the MME 606 determines to select another EPS NAS algorithm, then the UE 604 and the MME 606 may perform an NAS security mode command (SMC) procedure (e.g., an NAS SMC procedure 660) to derive new NAS keys with the selected EPS NAS algorithm. If, at 650, the MME 606 determines not to perform an algorithm change, or after the MME 606 and the UE 604 perform the NAS SMC procedure 660, the MME 606 may output a TAU accept message 662 that is received by the UE 604. The MME 606 may output (e.g., transmit or communicate) the TAU accept message 662 via an EPS NAS message.

At 664, the UE 604 may perform integrity verification of the TAU accept message 662. For example, the UE 604 may use the mapped EPS key ($K_{ASME}'$) of the UE mapped EPS security context 642 to perform the integrity verification of the TAU accept message 662. If the integrity verification is successful, the UE 604 may transmit a TAU complete message 666 that is received by the MME 606. If the integrity verification is unsuccessful, the UE 604 may discard the TAU complete message 666.

As described above, the UE 604 may initiate the procedure of FIG. 6 based on a reselection from a first cell associated with the 5G network 609 to a second cell associated with the EPS network 607. However, there may be occurrences when security contexts at the UE 604 and the MME 606 may not match.

For example, after establishing a connection with the second cell associated with the EPS network 607 and transmitting the first TAU request message 610, the UE 604 may experience a radio link failure (RLF). In such examples, the UE 604 may retransmit the first TAU request message 610, for example, after establishing a new RRC connection with another cell associated with the EPS network 607 or after re-establishing the RRC connection with the second cell. For example, the UE 604 may transmit a second TAU request message 670 that is received by the MME 606. The second TAU request message 670 may include the same information as the first TAU request (e.g., the first TAU request message 610).

However, when transmitting the second TAU request message 670, the UE 604 may use the updated 5G NAS Uplink count value to integrity protect the second TAU request message 670. For example, the 5G NAS Uplink count value used to integrity protect the first TAU request message 610 may be five and the 5G NAS Uplink count value used to integrity protect the second TAU request message 670 may be six.

In some examples, when the MME 606 receives the second TAU request message 670, the MME 606 may be configured to compare, at 672, the content of the first TAU request message 610 and the second TAU request message 670. In some examples, when the content (e.g., information elements) of the first TAU request message 610 and the second TAU request message 670 are the same, the MME 606 may discard the second TAU request message 670 and continue performing the TAU request procedure of FIG. 6 based on the first TAU request message 610. In such examples, the MME 606 may refrain from sending another context request message to the AMF 608 based on the second TAU request message 670.

It may be appreciated that refraining from sending another context request message may be sufficient in inter-MME scenarios as no security context mapping may occur. Additionally, refraining from sending another context request message may be sufficient when performing reselection from UMTS to EPS as freshness depending on a NONCE_UE may be used for context mapping. As used herein, a "NONCE_UE" refers to a 32-bit pseudo-random number generated by a UE to facilitate the freshness of UMTS to EPS security mapping. The NONCE_UE may be used as an input, along with existing security keys such as 3G security keys, to compute a mapped EPS key ($K_{ASME}'$).

However, as described in the example of FIG. 6, when performing 5G to EPS reselection (e.g., when performing reselection from the 5G network 609 to the EPS network 607), the AMF 608 may use the 5G NAS Uplink count associated with a TAU request message to generate the mapped EPS security context 636 (e.g., at 634). For example, the AMF 608 may use the value five of the 5G NAS Uplink count associated with the first TAU request message 610 to generate the mapped EPS security context 636 that the AMF 608 provides to the MME 606 through the context response message 638. The mapped EPS security context 636 may include an MME EPS key ($K_{ASME}'\_MME$) based on the 5G NAS Uplink count. Thus, the MME 606 may be configured with an MME EPS key ($K_{ASME}'\_MME$) based on the 5G NAS Uplink count value of five.

Similarly, the UE 604 may use the same 5G NAS Uplink count associated with the TAU request message to generate the UE mapped EPS security context 642 (e.g., at 640). For example, with respect to the first TAU request message 610, the UE 604 may generate, at 640, the UE mapped EPS security context 642 including a first UE EPS key ($K_{ASME}'\_UE$).

However, after transmitting the second TAU request message 670, the UE 604 may generate, at 680, a new UE mapped EPS security context 682. The new UE mapped EPS security context 682 may be based, at least in part, on the 5G NAS Uplink count value associated with the second TAU request message 670. For example, the new UE mapped EPS security context 682 may be based on the 5G NAS Uplink count value of six associated with the second TAU request message 670. In such examples, the new UE mapped EPS security context 682 may include a second UE EPS key ($K_{ASME}'\_UE2$). It may be appreciated that as the mapped EPS security context 636 and the new UE mapped EPS security context 682 may each be derived at the AMF 608 and the UE 604, respectively, using different 5G NAS Uplink count values, the MME EPS key ($K_{ASME}'\_MME$) at the MME 606 and the second UE EPS key ($K_{ASME}'\_UE2$) may also be different. As a result, since the mapped EPS keys $K_{ASME}'\_MME$, $K_{ASME}'\_UE2$ are different, the UE 604 may drop EPS NAS messages received from the MME 606. That is, since the UE 604 and the MME 606 are using mismatched mapped EPS security contexts and mapped EPS keys, the UE 604 may drop or reject EPS NAS messages from the MME 606 (e.g., the TAU accept message 662 and/or messages associated with the NAS SMC procedure 660) due to a disagreement on integrity computations. Such a scenario may result in service interruption and/or dropped calls.

Examples disclosed herein provide techniques for removing inconsistencies in the handling of repetitions of TAU request messages as described above. In a first aspect, disclosed techniques may remove inconsistencies by modifying how the MME 606 handles a repetition of a TAU request message. In a second aspect, disclosed techniques may remove inconsistencies by modifying how the UE 604 performs integrity protection of TAU request messages. In a third aspect, disclosed techniques may remove inconsistencies by modifying how the UE 604 performs integrity verification of EPS NAS messages.

As described above, when the MME 606 receives the second TAU request message 670, the MME 606 may discard the second TAU request message 670 and refrain from transmitting another context request message to the AMF 608 when the content (e.g., information elements) of the first TAU request message 610 and the second TAU request message 670 are the same. In the first example aspect, disclosed techniques may remove the inconsistencies described above by modifying how the MME handles the repetition of a TAU request message.

For example, the MME 606 may be configured to determine whether to transmit a context request message to the AMF 608 when the MME 606 is able to obtain an AMF address from a TAU request. That is, rather than refraining from transmitting a second context request message based on the first TAU request message 610 and the second TAU request message 670 including the same content (e.g., the same information elements), as described at 672, the MME 606 may determine whether to transmit the second context request message 674 based on whether the MME 606 is able to obtain an AMF address. Thus, if the second TAU request message 670 includes a mapped EPS GUTI including an AMF address, such as the mapped EPS GUTI 612, the MME 606 may determine to transmit the second context request message 674 to the AMF 608 requesting a new mapped EPS security context.

In such examples, the AMF 608 may generate the mapped EPS security context 636 based on the 5G NAS Uplink count associated with the second TAU request message 670 included in the second context request message 674 (e.g., the value six). As a result, the mapped EPS security context 636 and the new UE mapped EPS security context 682 may be derived based on the same 5G NAS Uplink count (e.g., the value six), which may result in the respective mapped EPS keys $K_{ASME'}$_MME, $K_{ASME'}$_UE2 also being the same. In some examples, the UE 604 may update, at 684, the security context of the UE 604 from the UE mapped EPS security context 642 to the new UE mapped EPS security context 682 based on the deriving of the new UE mapped EPS security context 682 (e.g., at 680).

In some examples, when the MME 606 receives a mapped EPS security context from the AMF 608, the MME 606 may be configured to update its mapped security context. For example, in some scenarios, the MME 606 may generate EPS NAS messages for transmitting to the UE 604 and may receive a new mapped EPS security context while the transmitting of one or more of the generated EPS NAS messages is pending. In such examples, the MME 606 may be configured to discard the pending EPS NAS messages that are integrity protected using the older mapped EPS security context.

It may be appreciated that as long as the MME 606 is able to obtain an address for transmitting the second context request message 674, the MME 606 may transmit a context request message requesting mapped EPS security context. Thus, in some examples, the address included in the mapped EPS GUTI may correspond to an AMF (e.g., the AMF 608). In other examples, the address included in the mapped EPS GUTI of the first TAU request message 610 and the second TAU request message 670 may map to an MME.

In some examples, the MME 606 may receive the second TAU request message 670 with the same information elements before transmitting the TAU accept message 662 to the UE 604. In some such examples, the MME 606 may forward the second TAU request message 670 to the AMF 608 (e.g., via the second context request message 674), as described above. In other examples, the MME 606 may perform authentication and activate a new native EPS security context to be used to protect subsequent NAS messages to the UE 604. For example, the MME 606 may determine to perform the NAS SMC procedure 660 with the UE 604 so that the MME 606 and the UE 604 are using the same EPS keys ($K_{ASME}$) for performing integrity verification of EPS NAS messages.

In some examples, the MME 606 may receive the second TAU request message 670 with the same information elements after transmitting the TAU accept message 662 to the UE 604. In some such examples, the MME 606 may determine to perform authentication and activate a new native EPS security context to be used to protect subsequent NAS messages to the UE 604. For example, the MME 606 may determine to perform the NAS SMC procedure 660 with the UE 604 so that the MME 606 and the UE 604 are using the same EPS keys ($K_{ASME}$) for performing integrity verification of EPS NAS messages.

In some examples, the MME 606 may receive the second TAU request message 670 with the same information elements after transmitting the TAU accept message 662 and before receiving the TAU complete message 666 from the UE 604. For aspects other than an inter-system change from an N1 mode to an S1 mode in IDLE mode with the UE 604 operating in a single-registration mode, the MME 606 may resend the TAU accept message 662. In some such examples, the MME 606 may restart a timer (e.g., a T3450 timer) if the TAU complete message 666 is expected. For aspects of inter-system change from an N1 mode to an S1 mode in the IDLE mode with the UE 604 operating in the single-registration mode, the MME 606 may initiate an authentication procedure with the UE 604 followed by performing a security mode control procedure (e.g., the NAS SMC procedure 660) to attempt to take a new partial native EPS security context into use. If the new partial native EPS security context is taken into use successfully, the MME 606 may set the new partial native EPS security context as a full native EPS security context. The MME 606 may also resend the TAU accept message 662 and integrity protect the resending of the TAU accept message 662 using the (new) full native EPS security context. In some examples, the MME 606 may also restart the T3450 timer. In such examples, a retransmission counter related to the T3450 timer may not be incremented.

In some examples, the MME 606 may receive the first TAU request message 610 and the second TAU request message 670 and may not yet have sent the TAU accept message 662 or a TAU reject message. If one or more of the information elements in the first TAU request message 610 and the second TAU request message 670 is different, the TAU procedure initiated based on the first TAU request message 610 may be aborted and a new TAU procedure initiated based on the second TAU request message 670 may progress (e.g., may proceed).

If the information elements in the first TAU request message 610 and the second TAU request message 670 are the same (e.g., do not differ), for aspects other than inter-system change from an N1 mode to an S1 mode in IDLE mode with the UE 604 operating in a single-registration mode, the MME 606 may continue with the previously initiated TAU procedure (e.g., based on the first TAU request message 610) and discard the second TAU request message 670. That is, the MME 606 may refrain from transmitting the second context request message 674 to the AMF 608 requesting new mapped EPS security context based on the second TAU request message 670.

For aspects of inter-system change from an N1 mode to an S1 mode in IDLE mode with the UE 604 operating in a single-registration mode, the MME 606 may forward a new TAU request message to the AMF 608 (e.g., through another context request message) to run an integrity check and to obtain the latest mapped EPS security context and to continue with the previous TAU procedure. For example, the MME 606 may forward the second TAU request message 670 to the AMF 608 (e.g., through the second context request message 674). As an example, the integrity check may be based on an integrity key, an uplink count, a direction of the transmission (e.g., a 1-bit indicator indicating the downlink direction of the downlink transmission), and the payload of the downlink transmission. The AMF 608 may verify the second TAU request message 670 (e.g., at 632). The AMF 608 may then generate a new mapped EPS security context based on the second TAU request message 670. For example, the new mapped EPS security context may be based, at least in part, on the 5G NAS Uplink count (e.g., the value six) associated with the second TAU request message 670. As a result, the mapped EPS security context 636 provided to the MME 606 including the new MME EPS key (e.g., $K_{ASME}'$ MME) may be the same as the new UE mapped EPS security context 682 including the new UE EPS key ($K_{ASME}'$_UE2). As a result, when the MME 606 uses the new MME EPS key (e.g., $K_{ASME}'$_MME) to integrity protect subsequent NAS messages (e.g., the TAU accept message 662), the UE 604 may successfully perform the integrity verification, at 664, on the subsequently received NAS messages (e.g., the TAU accept message 662). In some examples, the UE 604 may update, at 684, the security context of the UE 604 from the mapped EPS security context 642 to the new UE mapped EPS security context 682 based on the deriving of the new UE mapped EPS security context 682 (e.g., at 680).

In some examples, instead of forwarding the second TAU request message 670 that contains the same information elements as the first TAU request message 610 to the AMF 608, the MME 606 may determine to initiate an authentication procedure followed by a security mode control procedure to take the new partial native EPS security context into use. If the new partial native EPS security context is taken into use successfully (e.g., the NAS SMC procedure 660 is successful), then the MME 606 may set the new partial native EPS security context to the full native EPS security context and the full native EPS security may be used to protect any future NAS messages sent to the UE 604, such as the TAU accept message 662.

As described above, when the UE 604 transmits the first TAU request message 610 and the second TAU request message 670, the UE 604 integrity protects the respective TAU request message using a respective 5G NAS Uplink count. In the second example aspect, disclosed techniques may remove inconsistencies by modifying how the UE 604 performs the integrity protection of TAU request messages. For example, the UE 604 may be configured to use the same 5G NAS Uplink count value when transmitting two consecutive TAU request messages, such as the first TAU request message 610 and a repetition of the first TAU request message (e.g., the second TAU request message 670). For example, the UE 604 may skip incrementing, at 618, the 5G uplink NAS count of the 5G security context 690 by one.

By transmitting the first TAU request message 610 and the second TAU request message 670 without incrementing the 5G NAS Uplink count, the first TAU request message 610 and the second TAU request message 670 may be integrity protected using the same 5G NAS Uplink COUNT value. As a result, the mapped EPS security context 636 generated by the AMF 608 (e.g., at 634) and the new UE mapped EPS security context 682 generated by the UE 604 (e.g., at 680) may be the same. Accordingly, integrity verification performed on subsequent NAS messages received at the UE 604 (e.g., at 664) may be successful and communication between the UE 604 and a cell associated with the EPS network 607 may continue successfully. In some examples, the UE 604 may update, at 684, the security context of the UE 604 from the UE mapped EPS security context 642 to the new UE mapped EPS security context 682 based on the deriving of the new UE mapped EPS security context 682 (e.g., at 680).

That is, since the 5G NAS Uplink count values are the same for the first TAU request message 610 and the second TAU request message 670, the respective TAU request messages contain the same content (e.g., the same information elements) and are each integrity protected using the same 5G NAS Uplink COUNT value. In some examples, if the MME 606 receives the first TAU request message 610 and the second TAU request message 670, the MME 606 may discard the second TAU request message 670 and continue the TAU procedure based on the first TAU request message 610. In other examples in which the MME 606 does not receive the first TAU request message 610 (e.g., if radio link failure occurred and the network node 602 missed one or more RLC packets containing RRC connection setup complete information), but the MME 606 does receive the second TAU request message 670, the MME 606 may use the second TAU request message 670 to perform the TAU procedure of FIG. 6 (e.g., to request the mapped EPS security context from the AMF 608). In either scenario, the mapped EPS keys ($K_{ASME}'$_MME, $K_{ASME}'$_UE2) are the same and, thus, communication between the UE 604 and a cell associated with the EPS network 607 may continue successfully.

In the third example aspect, disclosed techniques may remove inconsistencies in the handling of repetitions of TAU request messages by modifying how the UE 604 performs integrity verification of EPS NAS messages. For example, the UE 604 may attempt to perform the integrity verification (e.g., at 664) based on different EPS keys.

For example, the UE 604 may derive a first EPS key ($K_{ASME}'1$) of the UE mapped EPS security context 642 based on the 5G key ($K_{AMF}$) and the 5G NAS Uplink count associated with the first TAU request message 610 (e.g., the value five). The UE 604 may then derive a first NAS integrity key (NAS_IK1) from the first EPS key ($K_{ASME}'1$).

The UE 604 may also derive a second EPS key ($K_{ASME}'2$) of the new UE mapped EPS security context 682 based on the 5G key ($K_{AMF}$) and the 5G NAS Uplink count associated with the second TAU request message 670 (e.g., the value six). The UE 604 may then derive a second NAS integrity key (NAS_IK2) from the second EPS key ($K_{ASME}'2$).

When the UE 604 receives an EPS NAS integrity protected message from the MME 606 (e.g., the TAU accept message 662), the UE 604 may attempt to perform integrity verification (e.g., at 664) using the NAS integrity keys (e.g., the NAS_IK1 and the NAS_IK2). If one of the NAS integrity keys allows the integrity verification to pass, the UE 604 selects the respective NAS integrity key and proceeds to communicate with a cell associated with the EPS network 607 based on the respective NAS integrity key. For example, if the integrity verification is successful using the first NAS integrity key (NAS_IK1), the UE 604 may set the first EPS key ($K_{ASME}'1$) as the EPS key ($K_{ASME}$). The UE 604 may also erase the second EPS key ($K_{ASME}'2$) and any other keys derived from the second EPS key ($K_{ASME}'2$). Similarly, if the integrity verification is successful using the second NAS integrity key (NAS_IK2), the UE 604 may set the second EPS key ($K_{ASME}'2$) as the EPS key ($K_{ASME}$). The UE 604 may also erase the first EPS key ($K_{ASME}'1$) and any other keys derived from the first EPS key ($K_{ASME}'1$). If performing the integrity verification fails using both of the NAS integrity keys (NAS_IK1, NAS_IK2) (e.g., neither of the NAS integrity keys successfully performed integrity verification), then the UE 604 may drop the EPS NAS message.

It may be appreciated that while the above description provides examples including two TAU request messages, other examples may include any suitable quantity of TAU request messages. For example, there may be z possible NAS Uplink COUNT values (e.g., x, x+1, x+2, ... z). If the integrity verification is successfully completed using a NAS integrity key (NAS_IK_y) derived from a y EPS key ($K_{ASME}$'y) using a 5G NAS Uplink COUNT y, where y is one of the possible z NAS Uplink COUNT values (e.g., x, x+1, x+2, ... z), then the UE 604 may set the y EPS key ($K_{ASME}$'y) as the EPS key ($K_{ASME}$) and erase all other EPS keys ($K_{ASME}$') and their respectively derived keys.

Figure 7:
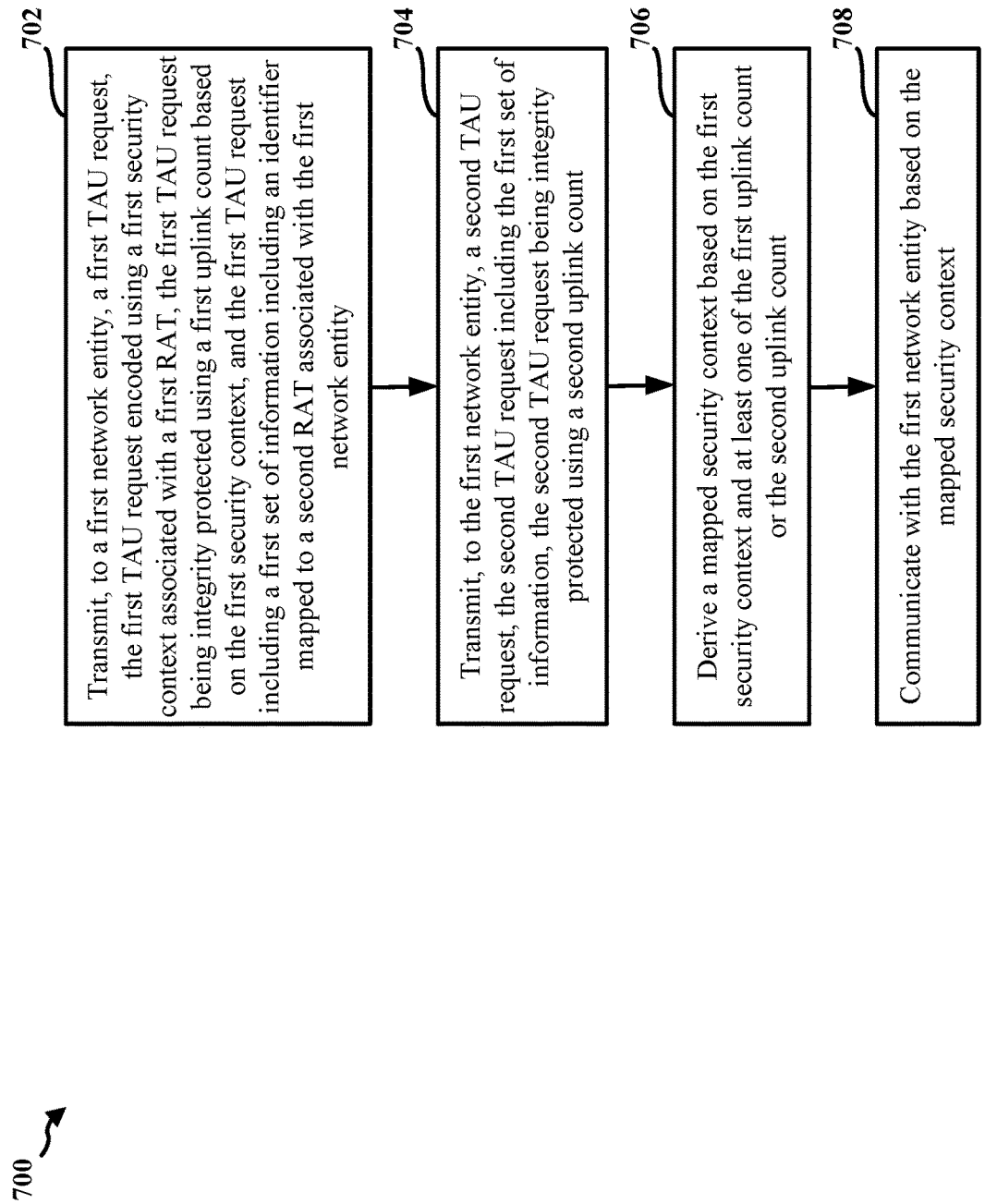
FIG. 7 is a flowchart of a method of wireless communication at a UE, in accordance with the teachings disclosed herein.

FIG. 7 is a flowchart 700 of a method of wireless communication. The method may be performed by a UE (e.g., the UE 104, the UE 350, the UE 404, and/or an apparatus 1104 of FIG. 11). The method may facilitate improving communication performance by improving security handling of first cell to second cell reselection in examples including RLF and retransmission of TAU request messages.

At 702, the UE transmits, to a first network entity, a first TAU request, as described in connection with the first TAU request message 610 of FIG. 6. The first TAU request may be encoded using a first security context associated with a first RAT, such as the 5G security context 690 of FIG. 6. The first TAU request may be integrity protected using a first uplink count based on the first security context, such as the 5G uplink NAS count 528 of FIG. 5. The first TAU request may include a first set of information including an identifier mapped to a second RAT associated with the first network entity, such as the mapped EPS GUTI 612 of FIG. 6. The transmitting of the first TAU request, at 702, may be performed by the UE security handling component 198 of the apparatus 1104 of FIG. 11.

In some examples, the UE may transmit the first TAU request when performing a change from a first cell associated with the first RAT to connect to a second cell associated with the second RAT. For example, the UE may transmit the first TAU request when performing a 5GS to EPS reselection. The second RAT may be different than the first RAT and the first network entity may be associated with the second RAT, as described in connection with the MME 606, the EPS network 607 and the 5G network 609 of FIG. 6.

At 704, the UE transmits, to the first network entity, a second TAU request, as described in connection with the second TAU request message 670 of FIG. 6. The second TAU request may include the first set of information, as described in connection with the mapped EPS GUTI 612, the NAS-MAC 614, and the eKSI parameter 616 of FIG. 6. The second TAU request may be integrity protected using a second uplink count. The transmitting of the second TAU request, at 704, may be performed by the UE security handling component 198 of the apparatus 1104 of FIG. 11.

At 706, the UE derives a mapped security context based on the first security context and at least one of the first uplink count or the second uplink count, as described in connection with the UE mapped EPS security context 642 and/or the new UE mapped EPS security context 682 of FIG. 6. The deriving of the mapped security context, at 706, may be performed by the UE security handling component 198 of the apparatus 1104 of FIG. 11.

At 708, the UE communicates with the first network entity based on the mapped security context, as described in connection with the TAU complete message 666 of FIG. 6. The communicating based on the mapped security context, at 714, may be performed by the UE security handling component 198 of the apparatus 1104 of FIG. 11.

Figure 8:
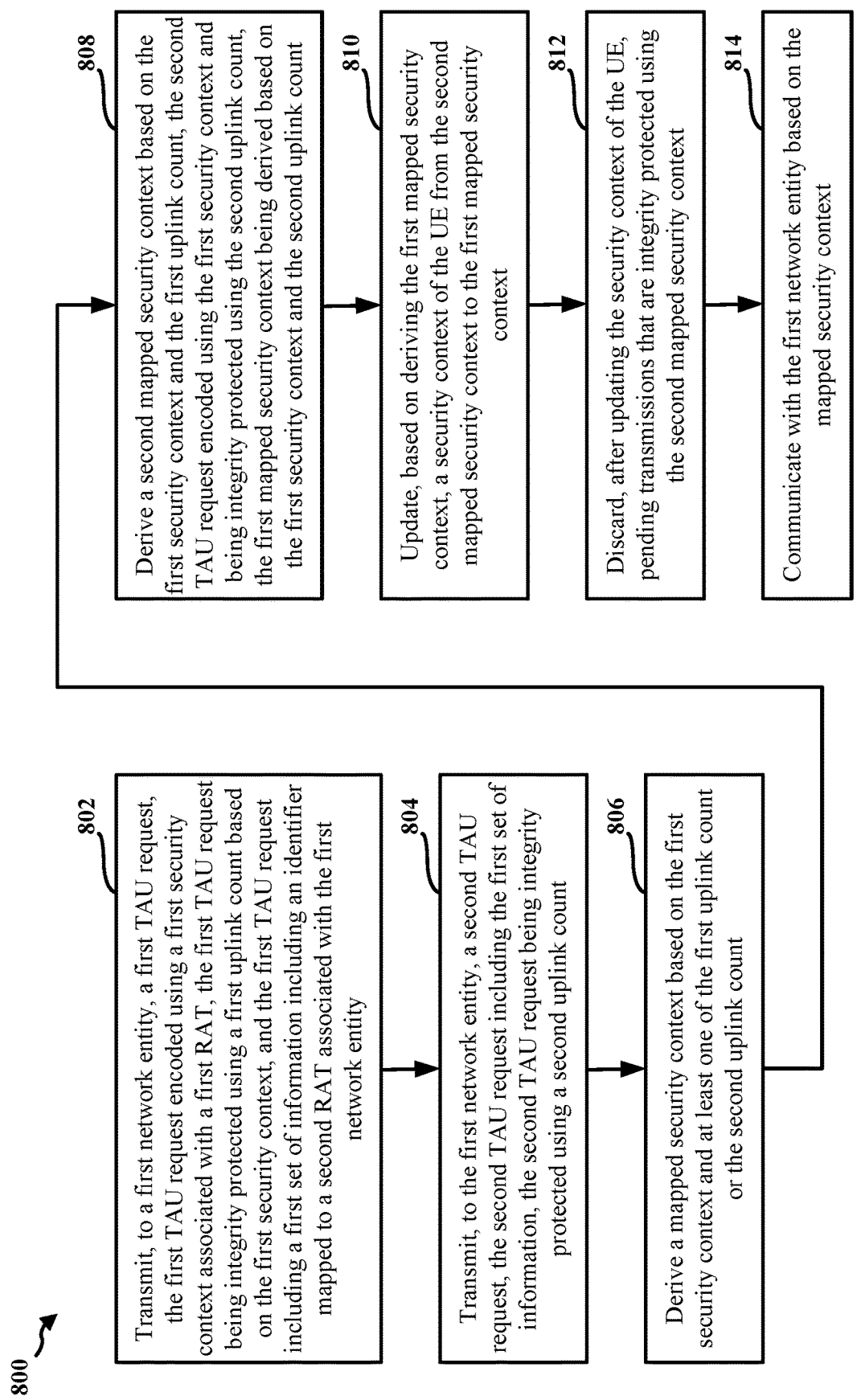
FIG. 8 is a flowchart of a method of wireless communication at a UE, in accordance with the teachings disclosed herein.

FIG. 8 is a flowchart 800 of a method of wireless communication. The method may be performed by a UE (e.g., the UE 104, the UE 350, the UE 404, and/or an apparatus 1104 of FIG. 11). The method may facilitate improving communication performance by improving security handling of first cell to second cell reselection in examples including RLF and retransmission of TAU request messages.

At 802, the UE transmits, to a first network entity, a first TAU request, as described in connection with the first TAU request message 610 of FIG. 6. The first TAU request may be encoded using a first security context associated with a first RAT, such as the 5G security context 690 of FIG. 6. The first TAU request may be integrity protected using a first uplink count based on the first security context, such as the 5G uplink NAS count 528 of FIG. 5. The first TAU request may include a first set of information including an identifier mapped to a second RAT associated with the first network entity, such as the mapped EPS GUTI 612 of FIG. 6. The transmitting of the first TAU request, at 802, may be performed by the UE security handling component 198 of the apparatus 1104 of FIG. 11.

In some examples, the UE may transmit the first TAU request when performing a change from a first cell associated with the first RAT to connect to a second cell associated with the second RAT. For example, the UE may transmit the first TAU request when performing a 5GS to EPS reselection. The second RAT may be different than the first RAT and the first network entity may be associated with the second RAT, as described in connection with the MME 606, the EPS network 607 and the 5G network 609 of FIG. 6.

At 804, the UE transmits, to the first network entity, a second TAU request, as described in connection with the second TAU request message 670 of FIG. 6. The second TAU request may include the first set of information, as described in connection with the mapped EPS GUTI 612, the NAS-MAC 614, and the eKSI parameter 616 of FIG. 6. The second TAU request may be integrity protected using a second uplink count. The transmitting of the second TAU request, at 804, may be performed by the UE security handling component 198 of the apparatus 1104 of FIG. 11.

At 806, the UE derives a mapped security context based on the first security context and at least one of the first uplink count or the second uplink count, as described in connection with the UE mapped EPS security context 642 and/or the new UE mapped EPS security context 682 of FIG. 6. The deriving of the mapped security context, at 806, may be performed by the UE security handling component 198 of the apparatus 1104 of FIG. 11.

At 814, the UE communicates with the first network entity based on the mapped security context, as described in connection with the TAU complete message 666 of FIG. 6. The communicating based on the mapped security context, at 814, may be performed by the UE security handling component 198 of the apparatus 1104 of FIG. 11.

In some examples, the second TAU request, at 804, may include a repetition of the first TAU request and the second uplink count may be a same value as the first uplink count, as described in connection with the second aspect of FIG. 6 in which the UE 604 removes inconsistencies in repetitions of TAU requests by modifying how the UE 604 performs integrity protection of TAU request messages. In some examples, the UE may transmit the second TAU request based on an occurrence of a radio link failure. In some examples, the mapped security context may be associated with the second RAT. For example, the mapped security context may be associated with the UE mapped EPS security context 642 or the new UE mapped EPS security context 682 of FIG. 6.

In some examples, the second TAU request may include a repetition of the first TAU request and the second uplink count, at 804, may be different than the first uplink count and the mapped security context may be a first mapped security context, as described in connection with the UE mapped EPS security context 642 of FIG. 6.

In some such examples, the UE may derive, at 808, a second mapped security context based on the first security context and the first uplink count, as described in connection with the new UE mapped EPS security context 682 of FIG. 6. The UE may encode the second TAU request using the first security context and the second TAU request may be integrity protected using the second uplink count. For example, the first TAU request may be integrity protected using an uplink NAS count value of five and the second TAU request may be integrity protected using an uplink NAS count value of six. The deriving of the second mapped security context, at 808, may be performed by the UE security handling component 198 of the apparatus 1104 of FIG. 11.

At 810, the UE may update, based on deriving the first mapped security context, a security context of the UE from the second mapped security context to the first mapped security context, as described in connection with 684 of FIG. 6. The updating of the security context of the UE, at 810, may be performed by the UE security handling component 198 of the apparatus 1104 of FIG. 11.

At 812, the UE may discard after updating the security context of the UE, pending transmissions that are integrity protected using the second mapped security context. The discarding of the pending transmissions, at 812, may be performed by the UE security handling component 198 of the apparatus 1104 of FIG. 11.

Figure 9:
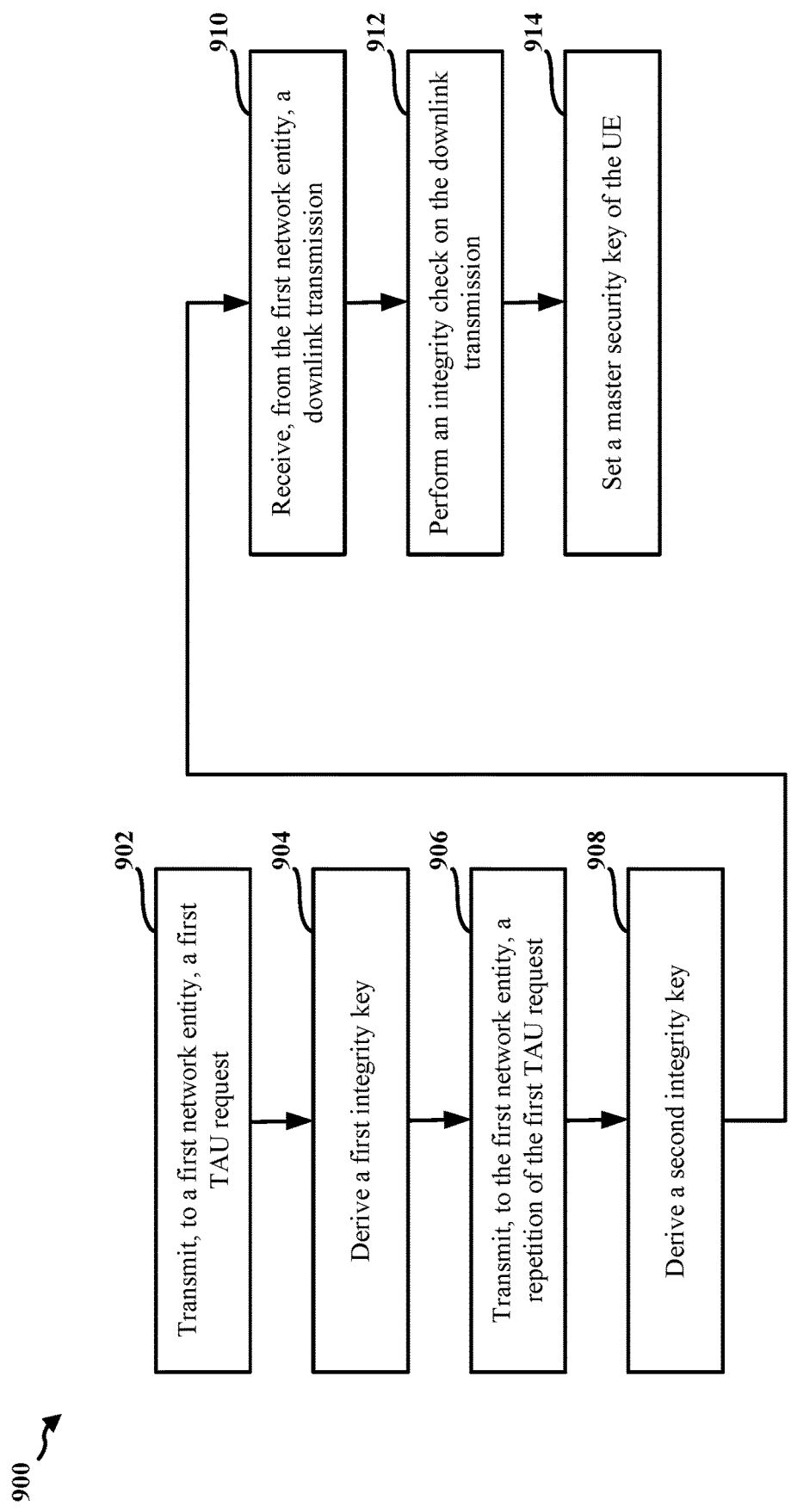
FIG. 9 is a flowchart of a method of wireless communication at a UE, in accordance with the teachings disclosed herein.

FIG. 9 is a flowchart 900 of a method of wireless communication. The method may be performed by a UE (e.g., the UE 104, the UE 350, the UE 404, and/or an apparatus 1104 of FIG. 11). The method may facilitate improving communication performance by improving security handling of first cell to second cell reselection in examples including RLF and retransmission of TAU request messages.

At 902, the UE transmits, to a first network entity, a first TAU request when performing a change from a first cell associated with a first RAT to connect to a second cell associated with a second RAT different than the first RAT, as described in connection with the first TAU request message 610 of FIG. 6. The first network entity may be associated with the second RAT, as described in connection with the MME 606 and the EPS network 607 of FIG. 7. The first TAU request may be encoded using a first security context associated with the first RAT, such as the g security context 690 of FIG. 6. The first TAU request may be integrity protected using a first uplink count based on the first security context. The transmitting of the first TAU request, at 902, may be performed by the UE security handling component 198 of the apparatus 1104 of FIG. 11.

At 904, the UE derives a first integrity key based on the first security context, the first uplink count, and the first mapped security context, as described in connection with the first NAS integrity key (NAS_IK1). For example, the UE may derive a first EPS key ($K_{ASME}'1$) of the UE mapped EPS security context 642 based on the 5G key ($K_{AMF}$) and the 5G NAS Uplink count (e.g., the value five) associated with the first TAU request message 610. The UE may then derive a first NAS integrity key (NAS_IK1) from the first EPS key ($K_{ASME}'1$). The deriving of the first integrity key, at 904, may be performed by the UE security handling component 198 of the apparatus 1104 of FIG. 11.

At 906, the UE transmits, to the first network entity, a repetition of the first TAU request, as described in connection with the second TAU request message 670 of FIG. 6. The repetition of the first TAU request may be integrity protected using a second uplink count different than the first uplink count. For example, the first TAU request may be integrity protected using an uplink NAS count value of five and the second TAU request may be integrity protected using an uplink NAS count value of six. The transmitting of the repetition of the first TAU request, at 906, may be performed by the UE security handling component 198 of the apparatus 1104 of FIG. 11.

At 908, the UE derives a second integrity key based on the first security context, the second uplink count, and a second mapped security context, as described in connection with the second NAS integrity key (NAS_IK2) from the second EPS key ($K_{ASME}'2$). For example, the UE may derive a second EPS key ($K_{ASME}'2$) of the new UE mapped EPS security context 682 based on the 5G key ($K_{AMF}$) and the 5G NAS Uplink COUNT value (e.g., six) associated with the associated with the second TAU request message 670. The UE may then derive a second NAS integrity key (NAS_IK2) from the second EPS key ($K_{ASME}'2$). The deriving of the second integrity key, at 908, may be performed by the UE security handling component 198 of the apparatus 1104 of FIG. 11.

At 910, the UE receives, from the first network entity, a downlink transmission, as described in connection with the TAU accept message 662 of FIG. 6. The receiving of the downlink transmission, at 910, may be performed by the UE security handling component 198 of the apparatus 1104 of FIG. 11.

At 912, the UE performs an integrity check on the downlink transmission using at least one of the first integrity key and the second integrity key, as described in connection with 664 of FIG. 6. The performing of the integrity check, at 912, may be performed by the UE security handling component 198 of the apparatus 1104 of FIG. 11.

At 914, the UE sets a master security key of the UE when the integrity check on the downlink transmission is successful using a derived integrity key. The master security key may be set based on the respective integrity key used to successfully perform the integrity check. The setting of the master security key, at 914, may be performed by the UE security handling component 198 of the apparatus 1104 of FIG. 11.

Figure 10:
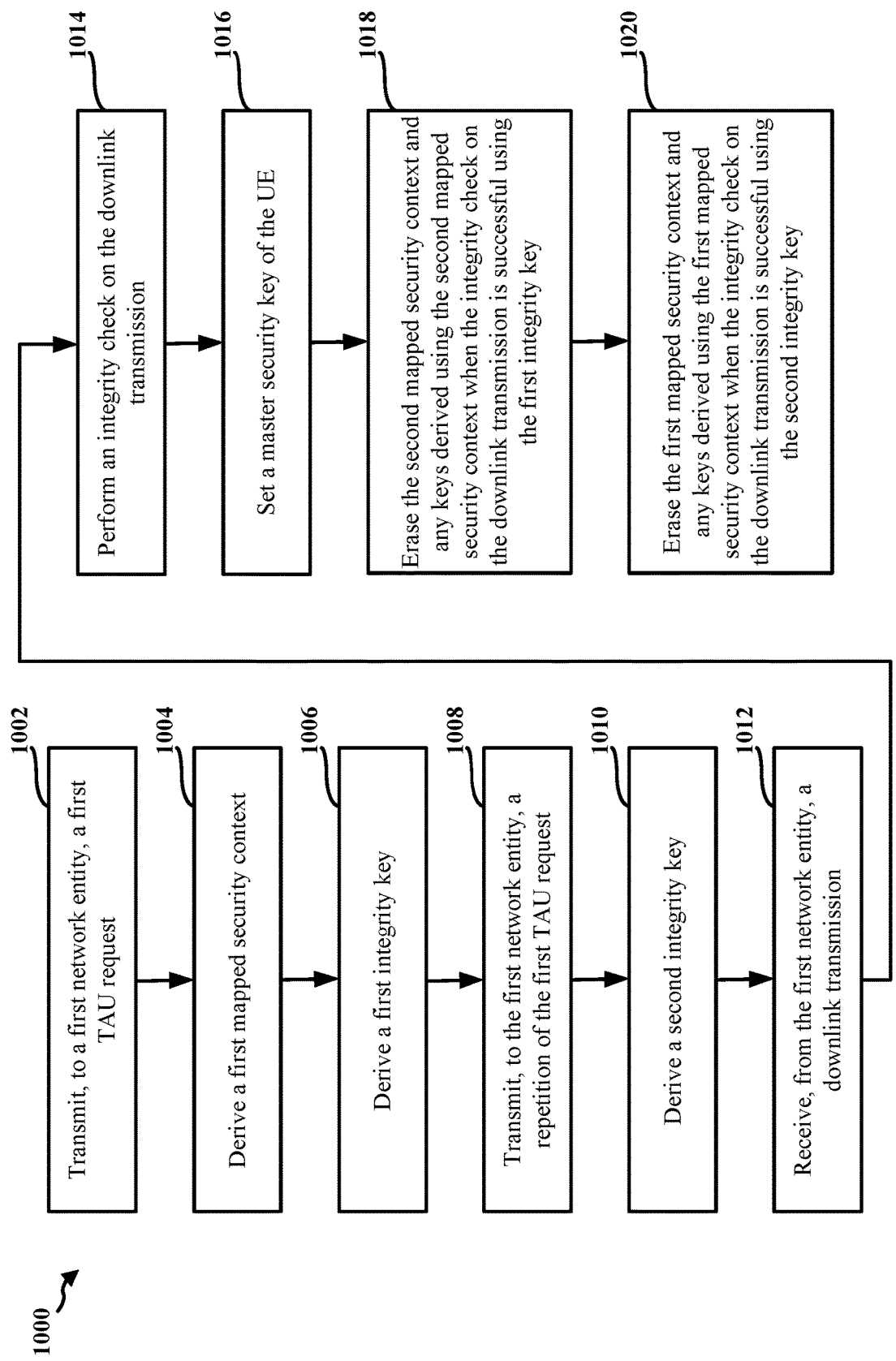
FIG. 10 is a flowchart of a method of wireless communication at a UE, in accordance with the teachings disclosed herein.

FIG. 10 is a flowchart 1000 of a method of wireless communication. The method may be performed by a UE (e.g., the UE 104, the UE 350, the UE 404, and/or an apparatus 1104 of FIG. 11). The method may facilitate improving communication performance by improving security handling of first cell to second cell reselection in examples including RLF and retransmission of TAU request messages.

At 1002, the UE transmits, to a first network entity, a first TAU request when performing a change from a first cell associated with a first RAT to connect to a second cell associated with a second RAT different than the first RAT, as described in connection with the first TAU request message 610 of FIG. 6. The first network entity may be associated with the second RAT, as described in connection with the MME 606 and the EPS network 607 of FIG. 7. The first TAU request may be encoded using a first security context associated with the first RAT, such as the g security context 690 of FIG. 6. The first TAU request may be integrity protected using a first uplink count based on the first security context. The transmitting of the first TAU request, at 1002, may be performed by the UE security handling component 198 of the apparatus 1104 of FIG. 11.

In some examples, the UE may derive, at 1004, a first mapped security context based on the first security context and the first uplink count, as described in connection with the UE mapped EPS security context 642 of FIG. 6. The deriving of the first mapped security context, at 1004, may be performed by the UE security handling component 198 of the apparatus 1104 of FIG. 11.

At 1006, the UE derives a first integrity key based on the first security context, the first uplink count, and the first mapped security context, as described in connection with the first NAS integrity key (NAS_IK1). For example, the UE may derive a first EPS key ($K_{ASME}'1$) of the UE mapped EPS security context 642 based on the 5G key ($K_{AMF}$) and the 5G NAS Uplink count (e.g., the value five) associated with the first TAU request message 610. The UE may then derive a first NAS integrity key (NAS_IK1) from the first EPS key ($K_{ASME}'1$). The deriving of the first integrity key, at 1006, may be performed by the UE security handling component 198 of the apparatus 1104 of FIG. 11.

At 1008, the UE transmits, to the first network entity, a repetition of the first TAU request, as described in connection with the second TAU request message 670 of FIG. 6. The repetition of the first TAU request may be integrity protected using a second uplink count different than the first uplink count. For example, the first TAU request may be integrity protected using an uplink NAS count value of five and the second TAU request may be integrity protected using an uplink NAS count value of six. The transmitting of the repetition of the first TAU request, at 1008, may be performed by the UE security handling component 198 of the apparatus 1104 of FIG. 11.

At 1010, the UE derives a second integrity key based on the first security context, the second uplink count, and a second mapped security context, as described in connection with the second NAS integrity key (NAS_IK2) from the second EPS key ($K_{ASME}'2$). For example, the UE may derive a second EPS key ($K_{ASME}'2$) of the new UE mapped EPS security context 682 based on the 5G key ($K_{AMF}$) and the 5G NAS Uplink COUNT value (e.g., six) associated with the associated with the second TAU request message 670. The UE may then derive a second NAS integrity key (NAS_IK2) from the second EPS key ($K_{ASME}'2$). The deriving of the second integrity key, at 1010, may be performed by the UE security handling component 198 of the apparatus 1104 of FIG. 11.

At 1012, the UE receives, from the first network entity, a downlink transmission, as described in connection with the TAU accept message 662 of FIG. 6. The receiving of the downlink transmission, at 1012, may be performed by the UE security handling component 198 of the apparatus 1104 of FIG. 11.

At 1014, the UE performs an integrity check on the downlink transmission using at least one of the first integrity key and the second integrity key, as described in connection with 664 of FIG. 6. The performing of the integrity check, at 1014, may be performed by the UE security handling component 198 of the apparatus 1104 of FIG. 11.

At 1016, the UE sets a master security key of the UE when the integrity check on the downlink transmission is successful using a derived integrity key. The master security key may be set based on the respective integrity key used to successfully perform the integrity check. The setting of the master security key, at 1016, may be performed by the UE security handling component 198 of the apparatus 1104 of FIG. 11.

In some examples, the UE may then discard information related to the other derived integrity keys after setting the master security key. For example, the UE may set, at 1016, the master security key to the first mapped security context. In such examples, the UE may erase, at 1018, the second mapped security context and any keys derived using the second mapped security context when the integrity check on the downlink transmission is successful using the first integrity key. The erasing of the second mapped security context, at 1018, may be performed by the UE security handling component 198 of the apparatus 1104 of FIG. 11.

In other examples, the UE may set, at 1016, the master security key to the second mapped security context. In such examples, the UE may erase, at 1020, the first mapped security context and any keys derived using the first mapped security context when the integrity check on the downlink transmission is successful using the second integrity key. The erasing of the first mapped security context, at 1020, may be performed by the UE security handling component 198 of the apparatus 1104 of FIG. 11.

Figure 11:
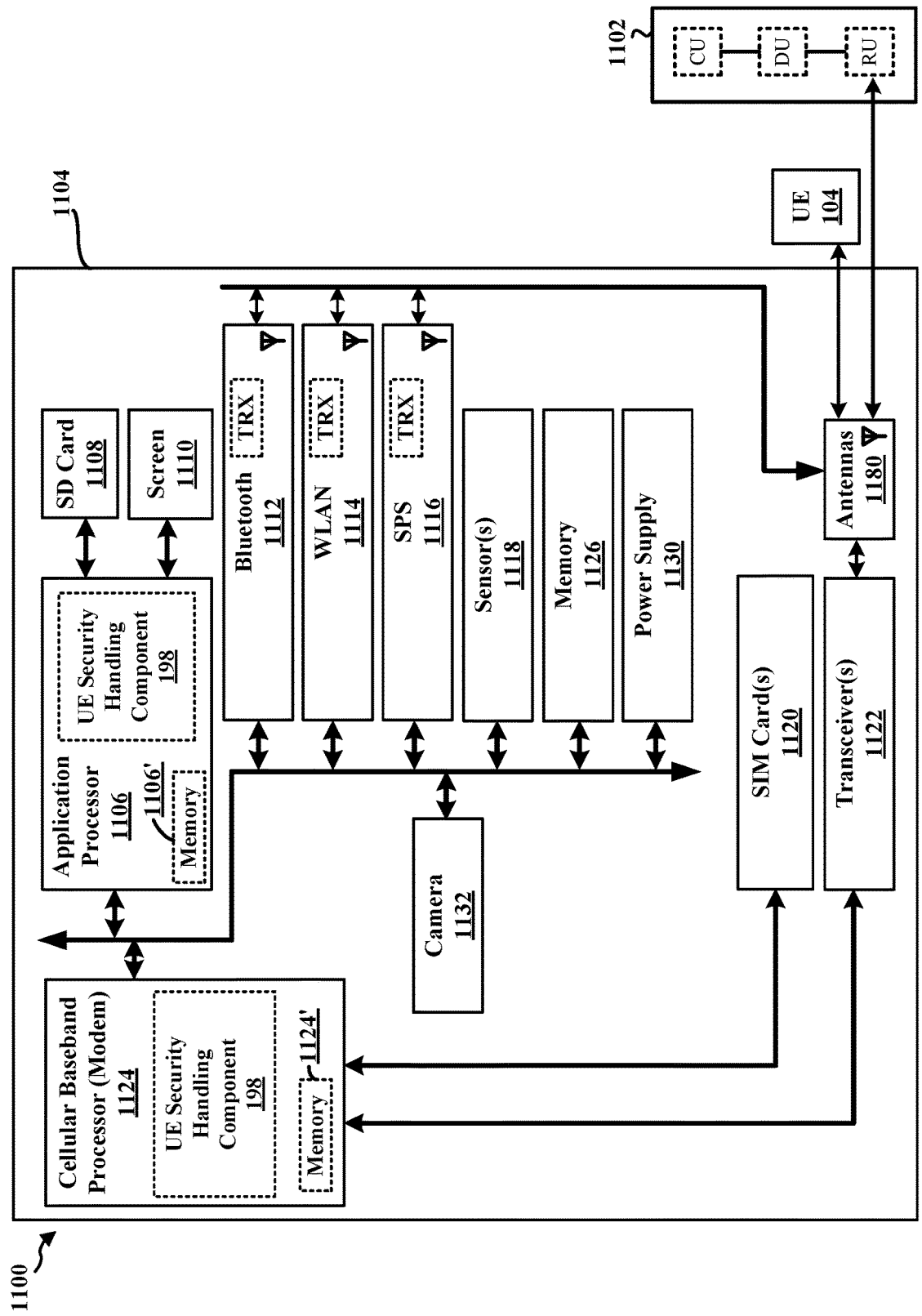
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers (e.g., a cellular RF transceiver 1122). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize one or more antennas 1180 for communication. The cellular baseband processor 1124 communicates through transceiver(s) (e.g., the cellular RF transceiver 1122) via one or more antennas 1180 with the UE 104 and/or with an RU associated with a network entity 1102. The cellular baseband processor 1124 and the application processor 1106 may each include a computer-readable medium/memory, such as the on-chip memory 1124', and the on-chip memory 1106', respectively. The additional memory modules 1126 may also be considered a computer-readable medium/memory. Each computer-readable medium/memory (e.g., the on-chip memory 1124', the on-chip memory 1106', and/or the additional memory modules 1126) may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see the UE 350 of FIG. 3) and include the additional modules of the apparatus 1104.

As discussed supra, the UE security handling component 198 is configured to: transmit, to a first network entity, a first tracking area update (TAU) request, the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; transmit, to the first network entity, a second TAU request, the second TAU request including the first set of information, the second TAU request being integrity protected using a second uplink count; derive a mapped security context based on the first security context and at least one of the first uplink count or the second uplink count; and communicate with the first network entity based on the mapped security context.

In another aspect, the UE security handling component 198 may be configured to: transmit, to a first network entity, a first tracking area update (TAU) request when performing a change from a first cell associated with a first radio access technology (RAT) to connect to a second cell associated with a second RAT different than the first RAT, the first network entity associated with the second RAT, the first TAU request encoded using a first security context associated with the first RAT, and the first TAU request being integrity protected using a first uplink count based on the first security context; derive a first integrity key based on the first security context, the first uplink count, and a first mapped security context; transmit, to the first network entity, a repetition of the first TAU request, the repetition of the first TAU request being integrity protected using a second uplink count that is different than the first uplink count; derive a second integrity key based on the first security context, the second uplink count, and a second mapped security context; receive, from the first network entity, a downlink transmission; perform an integrity check on the downlink transmission using at least one of the first integrity key and the second integrity key; and set a master security key of the UE when the integrity check on the downlink transmission is successful using a derived integrity key, the master security key being set based on the first mapped security context or the second mapped security context used to derive the derived integrity key.

The UE security handling component 198 may be within the cellular baseband processor 1124, the application processor 1106, or both the cellular baseband processor 1124 and the application processor 1106. The UE security handling component may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1104 may include a variety of components configured for various functions. For example, the UE security handling component may include one or more hardware components that perform each of the blocks of the algorithm in the flowcharts of FIG. 7, FIG. 8, FIG. 9, and/or FIG. 10.

In one configuration, the apparatus 1104, and in particular the cellular baseband processor 1124 and/or the application processor 1106, includes means for transmitting, to a first network entity, a first tracking area update (TAU) request, the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; transmitting, to the first network entity, a second TAU request, the second TAU request including the first set of information, the second TAU request being integrity protected using a second uplink count; deriving a mapped security context based on the first security context and at least one of the first uplink count or the second uplink count; and communicating with the first network entity based on the mapped security context.

In another configuration, the example apparatus 1104 also includes means for transmitting the first TAU request when performing a change from a first cell associated with the first RAT to connect to a second cell associated with the second RAT, the second RAT being different than the first RAT, the first network entity being associated with the second RAT.

In another configuration, the second TAU request includes a repetition of the first TAU request, and the second uplink count is a same value as the first uplink count.

In another configuration, the example apparatus 1104 also includes means for transmitting the second TAU request based on an occurrence of a radio link failure.

In another configuration, the mapped security context is associated with the second RAT.

In another configuration, the second uplink count is different than the first uplink count and the mapped security context is a first mapped security context, and the example apparatus 1104 also includes means for deriving a second mapped security context based on the first security context and the first uplink count, the second TAU request encoded using the first security context and being integrity protected using the second uplink count, the first mapped security context being derived based on the first security context and the second uplink count.

In another configuration, the example apparatus 1104 also includes means for updating, based on deriving the first mapped security context, a security context of the UE from the second mapped security context to the first mapped security context; and discarding, after updating the security context of the UE, pending transmissions that are integrity protected using the second mapped security context.

In another configuration, the second TAU request comprises a repetition of the first TAU request.

In one configuration, the apparatus 1104, and in particular the cellular baseband processor 1124 and/or the application processor 1106, includes means for transmitting, to a first network entity, a first tracking area update (TAU) request when performing a change from a first cell associated with a first radio access technology (RAT) to connect to a second cell associated with a second RAT different than the first RAT, the first network entity associated with the second RAT, the first TAU request encoded using a first security context associated with the first RAT, and the first TAU request being integrity protected using a first uplink count based on the first security context; deriving a first integrity key based on the first security context, the first uplink count, and a first mapped security context; transmitting, to the first network entity, a repetition of the first TAU request, the repetition of the first TAU request being integrity protected using a second uplink count that is different than the first uplink count; deriving a second integrity key based on the first security context, the second uplink count, and a second mapped security context; receiving, from the first network entity, a downlink transmission; performing an integrity check on the downlink transmission using at least one of the first integrity key and the second integrity key; and setting a master security key of the UE when the integrity check on the downlink transmission is successful using a derived integrity key, the master security key being set based on the first mapped security context or the second mapped security context used to derive the derived integrity key.

In another configuration, the example apparatus 1104 also includes means for erasing the second mapped security context and any keys derived using the second mapped security context when the integrity check on the downlink transmission is successful using the first integrity key, where the master security key comprises the first mapped security context.

In another configuration, the example apparatus 1104 also includes means for erasing the first mapped security context and any keys derived using the first mapped security context when the integrity check on the downlink transmission is successful using the second integrity key, where the master security key comprises the second mapped security context.

In another configuration, the example apparatus 1104 also includes means for deriving the first mapped security context based on the first security context and the first uplink count.

The means may be the UE security handling component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
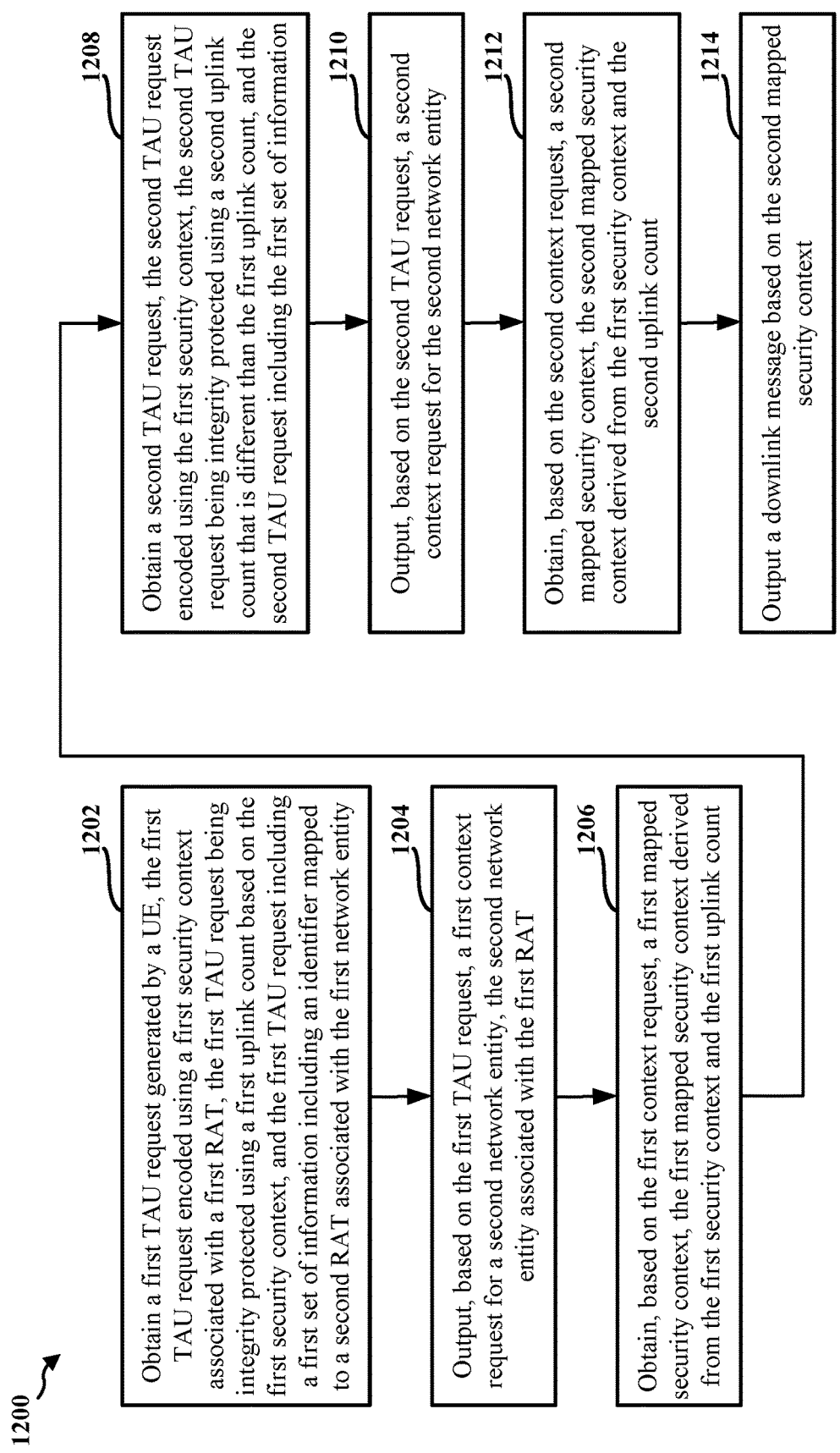
FIG. 12 is a flowchart of a method of wireless communication at a network entity, in accordance with the teachings disclosed herein.

FIG. 12 is a flowchart 1200 of a method of wireless communication. The method may be performed by a first network entity (e.g., the base station 102, or a component of the base station 102, the MME 412, the AMF 432, a network entity 1602 of FIG. 16, and/or a network entity 1760 of FIG. 17). The method may facilitate improving communication performance by improving security handling of first cell to second cell reselection in examples including RLF and retransmission of TAU request messages.

The first network entity may be in communication with a UE and a second network entity. In some examples, the first network entity may include an MME, such as the MME 606 of FIG. 6, and a second network entity may include an AMF, such as the AMF 608 of FIG. 6.

At 1202, the first network entity obtains a first TAU request generated by a UE, as described in connection with the first TAU request message 610 of FIG. 6. The first TAU request may be encoded using a first security context associated with a first RAT, such as the 5G security context 690 of FIG. 6. The first TAU request may be integrity protected using a first uplink count based on the first security context, such as the 5G NAS uplink count associated with the first TAU request message 610. The first TAU request may include a first set of information including an identifier mapped to a second RAT associated with the first network entity, as described in connection with the mapped EPS GUTI 612 of FIG. 6. The obtaining of the first TAU request, at 1202, may be performed by the network security handling component 199 of the network entity 1602 of FIG. 16 and/or the network security handling component 497 of the network entity 1760 of FIG. 17.

At 1204, the first network entity outputs, based on the first TAU request, a first context request for a second network entity, as described in connection with the context request message 622 and the AMF 608 of FIG. 6. The second network entity may be associated with the first RAT, such as the AMF 608 being associated with the 5G network 609. In some examples, the first context request may include the identifier mapped to the second RAT, such as the mapped EPS GUTI 612 of the first TAU request message 610 of FIG. 6. In some examples, the first TAU request may be integrity protected using the first uplink count. The outputting of the first context request, at 1204, may be performed by the network security handling component 199 of the network entity 1602 of FIG. 16 and/or the network security handling component 497 of the network entity 1760 of FIG. 17.

At 1206, the first network entity obtains, based on the first context request, a first mapped security context, as described in connection with the mapped EPS security context 636 of FIG. 6. The first mapped security context may be derived from the first security context and the first uplink count. The obtaining of the first mapped security context, at 1206, may be performed by the network security handling component 199 of the network entity 1602 of FIG. 16 and/or the network security handling component 497 of the network entity 1760 of FIG. 17.

At 1208, the first network entity obtains a second TAU request, as described in connection with the second TAU request message 670 of FIG. 6. The second TAU request may be encoded using the first security context. The second TAU request may be integrity protected using a second uplink count that is different than the first uplink count. For example, the first TAU request may be integrity protected using an uplink NAS count value of five and the second TAU request may be integrity protected using an uplink NAS count value of six. The second TAU request may include the first set of information, as described in connection with the mapped EPS GUTI 612, the NAS-MAC 614, and the eKSI parameter 616 of FIG. 6. In some examples, the second TAU request may include a repetition of the first TAU request. The obtaining of the second TAU request, at 1208, may be performed by the network security handling component 199 of the network entity 1602 of FIG. 16 and/or the network security handling component 497 of the network entity 1760 of FIG. 17.

At 1210, the first network entity outputs, based on the second TAU request, a second context request for the second network entity, as described in connection with the second context request message 674 of FIG. 6. The outputting of the second context request, at 1210, may be performed by the network security handling component 199 of the network entity 1602 of FIG. 16 and/or the network security handling component 497 of the network entity 1760 of FIG. 17.

At 1212, the first network entity obtains, based on the second context request, a second mapped security context, the second mapped security context derived from the first security context and the second uplink count. Aspects of the obtaining the second mapped security context may be similar to obtaining the first mapped security context, as described in connection with the mapped EPS security context 636 of FIG. 6. The obtaining of the second mapped security context, at 1212, may be performed by the network security handling component 199 of the network entity 1602 of FIG. 16 and/or the network security handling component 497 of the network entity 1760 of FIG. 17.

At 1214, the first network entity outputs a downlink message based on the second mapped security context, as described in connection with the TAU accept message 662 of FIG. 6. The outputting of the downlink message, at 1214, may be performed by the network security handling component 199 of the network entity 1602 of FIG. 16 and/or the network security handling component 497 of the network entity 1760 of FIG. 17.

Figure 13:
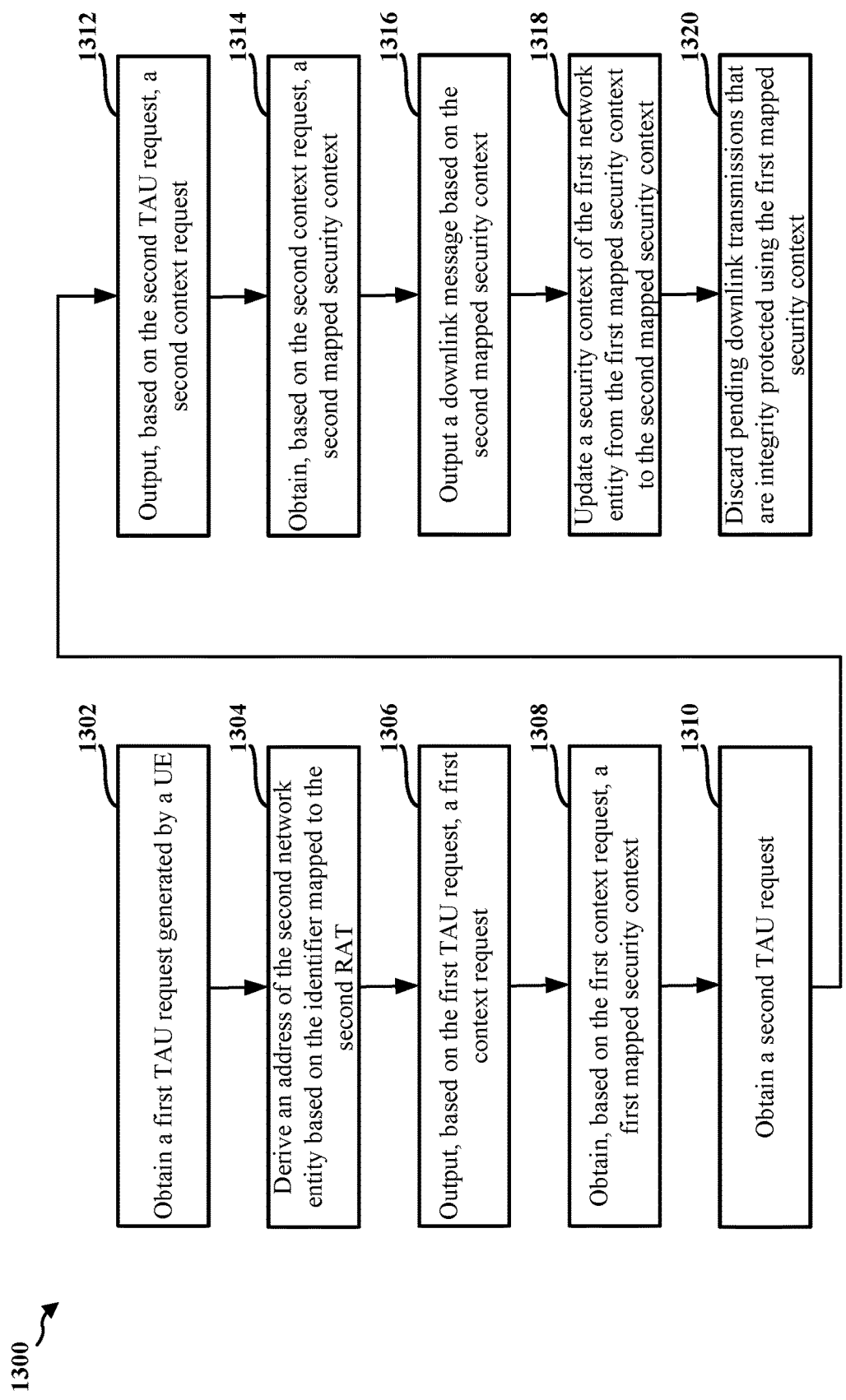
FIG. 13 is a flowchart of a method of wireless communication at a network entity, in accordance with the teachings disclosed herein.

FIG. 13 is a flowchart 1300 of a method of wireless communication. The method may be performed by a first network entity (e.g., the base station 102, or a component of the base station 102, the MME 412, the AMF 432, a network entity 1602 of FIG. 16, and/or a network entity 1760 of FIG. 17). The method may facilitate improving communication performance by improving security handling of first cell to second cell reselection in examples including RLF and retransmission of TAU request messages.

The first network entity may be in communication with a UE and a second network entity. In some examples, the first network entity may include an MME, such as the MME 606 of FIG. 6, and a second network entity may include an AMF, such as the AMF 608 of FIG. 6.

At 1302, the first network entity obtains a first TAU request generated by a UE, as described in connection with the first TAU request message 610 of FIG. 6. The first TAU request may be encoded using a first security context associated with a first RAT, such as the 5G security context 690 of FIG. 6. The first TAU request may be integrity protected using a first uplink count based on the first security context, such as the 5G NAS uplink count associated with the first TAU request message 610. The first TAU request may include a first set of information including an identifier mapped to a second RAT associated with the first network entity, as described in connection with the mapped EPS GUTI 612 of FIG. 6. The obtaining of the first TAU request, at 1302, may be performed by the network security handling component 199 of the network entity 1602 of FIG. 16 and/or the network security handling component 497 of the network entity 1760 of FIG. 17.

In some examples, the first network entity may derive, at 1304, an address of the second network entity based on the identifier mapped to the second RAT, as described in connection with 620 of FIG. 6. The deriving of the address of the second network entity, at 1304, may be performed by the network security handling component 199 of the network entity 1602 of FIG. 16 and/or the network security handling component 497 of the network entity 1760 of FIG. 17.

At 1306, the first network entity outputs, based on the first TAU request, a first context request for a second network entity, as described in connection with the context request message 622 and the AMF 608 of FIG. 6. The second network entity may be associated with the first RAT, such as the AMF 608 being associated with the 5G network 609. In some examples, the first context request may include the identifier mapped to the second RAT, such as the mapped EPS GUTI 612 of the first TAU request message 610 of FIG. 6. In some examples, the first TAU request may be integrity protected using the first uplink count. The outputting of the first context request, at 1306, may be performed by the network security handling component 199 of the network entity 1602 of FIG. 16 and/or the network security handling component 497 of the network entity 1760 of FIG. 17.

At 1308, the first network entity obtains, based on the first context request, a first mapped security context, as described in connection with the mapped EPS security context 636 of FIG. 6. The first mapped security context may be derived from the first security context and the first uplink count. The obtaining of the first mapped security context, at 1308, may be performed by the network security handling component 199 of the network entity 1602 of FIG. 16 and/or the network security handling component 497 of the network entity 1760 of FIG. 17.

At 1310, the first network entity obtains a second TAU request, as described in connection with the second TAU request message 670 of FIG. 6. The second TAU request may be encoded using the first security context. The second TAU request may be integrity protected using a second uplink count that is different than the first uplink count. For example, the first TAU request may be integrity protected using an uplink NAS count value of five and the second TAU request may be integrity protected using an uplink NAS count value of six. The second TAU request may include the first set of information, as described in connection with the mapped EPS GUTI 612, the NAS-MAC 614, and the eKSI parameter 616 of FIG. 6. In some examples, the second TAU request may include a repetition of the first TAU request. The obtaining of the second TAU request, at 1310, may be performed by the network security handling component 199 of the network entity 1602 of FIG. 16 and/or the network security handling component 497 of the network entity 1760 of FIG. 17.

At 1312, the first network entity outputs, based on the second TAU request, a second context request for the second network entity, as described in connection with the second context request message 674 of FIG. 6. The outputting of the second context request, at 1312, may be performed by the network security handling component 199 of the network entity 1602 of FIG. 16 and/or the network security handling component 497 of the network entity 1760 of FIG. 17.

At 1314, the first network entity obtains, based on the second context request, a second mapped security context, the second mapped security context derived from the first security context and the second uplink count. Aspects of the obtaining the second mapped security context may be similar to obtaining the first mapped security context, as described in connection with the mapped EPS security context 636 of FIG. 6. The obtaining of the second mapped security context, at 1314, may be performed by the network security handling component 199 of the network entity 1602 of FIG. 16 and/or the network security handling component 497 of the network entity 1760 of FIG. 17.

At 1316, the first network entity outputs a downlink message based on the second mapped security context, as described in connection with the TAU accept message 662 of FIG. 6. The outputting of the downlink message, at 1316, may be performed by the network security handling component 199 of the network entity 1602 of FIG. 16 and/or the network security handling component 497 of the network entity 1760 of FIG. 17.

In some examples, at 1318, the first network entity may update, based on obtaining the second mapped security context, a security context of the first network entity from the first mapped security context to the second mapped security context. The updating of the security context of the first network entity, at 1318, may be performed by the network security handling component 199 of the network entity 1602 of FIG. 16 and/or the network security handling component 497 of the network entity 1760 of FIG. 17.

Additionally, at 1320, the first network entity may discard, after updating the security context of the first network entity, pending downlink transmissions that are integrity protected using the first mapped security context. The discarding of pending downlink transmissions, at 1320, may be performed by the network security handling component 199 of the network entity 1602 of FIG. 16 and/or the network security handling component 497 of the network entity 1760 of FIG. 17.

In some examples, the first network entity may obtain the second TAU request message, at 1310, with the same information elements after outputting the downlink message, at 1316, and before obtaining an uplink message in response to the downlink message. For example, the first network entity may obtain the second TAU request message after outputting the TAU accept message 662 and before obtaining the TAU complete message 666.

In some examples in which the first network entity obtains the first TAU request, at 1302, based on a non-inter-system change from an N1 mode to an S1 mode, the UE is configured to operate in a single-registration mode, and the downlink message includes a TAU accept message, the first network entity may resend the downlink message. In some examples, the first network entity may restart a T3450 timer when a TAU complete message is expected from the UE, such as the TAU complete message 666 of FIG. 6. The first network entity may also skip incrementing a retransmission counter related to the T3450 timer.

In some examples in which the first network entity obtains the first TAU request, at 1302, based on an inter-system change from an N1 mode to an S1 mode, the UE is configured to operate in a single-registration mode, and the downlink message includes a TAU accept message, the first network entity may initiate an authentication procedure with the UE. The first network entity may also perform a security mode control procedure to transition a new partial native EPS security context to a current full native EPS security context. For example, the first network entity may perform the NAS SMC procedure 660 with the UE to transition a partial native EPS security context to a full native EPS security context to facilitate communicating EPS NAS messages with the UE.

In some examples in which the security mode control procedure is successful, the first network entity may output a downlink message repetition, the downlink message repetition being integrity protected using the current full native EPS security context. The first network entity may also restart a T3450 timer when a TAU complete message is expected from the UE, such as the TAU complete message 666 of FIG. 6. The first network entity may also skip incrementing a retransmission counter related to the T3450 timer.

In some examples in which the first network entity obtains the first TAU request, at 1302, based on a non-inter-system change from an N1 mode to an S1 mode, and the UE is configured to operate in a single-registration mode, the first network entity may skip initiating of a TAU procedure based on the second TAU request. The first network entity may also integrity protect the downlink messaged based on the first mapped security context.

In some examples in which the first network entity obtains the first TAU request, at 1302, based on an inter-system change from an N1 mode to an S1 mode, and the UE is configured to operate in a single-registration mode, the first network entity may determine to initiate a second TAU procedure. For example, the first network entity may output the second context request to the second network entity, at 1312. The first network entity may also integrity protect the downlink message based on the second mapped security context.

In some examples, the first network entity may receive the TAU request messages and may not yet have sent the TAU accept message or a TAU reject message. If one or more of the information elements in the TAU request messages differs, the TAU procedure initiated based on the first TAU request message may be aborted and the TAU procedure initiated based on the second TAU request message may progress (e.g., may proceed).

If the information elements in the TAU request messages are the same (e.g., do not differ), for aspects other than inter-system change from an N1 mode to an S1 mode in IDLE mode with the UE operating in a single-registration mode, the first network entity may continue with the previously initiated TAU procedure (e.g., based on the first TAU request message) and discard the second TAU request message. That is, the first network entity may refrain from transmitting the second context request message to the second network entity requesting new mapped EPS security context based on the second TAU request message.

For aspects of inter-system change from an N1 mode to an S1 mode in IDLE mode with the UE operating in a single-registration mode, the first network entity may forward a new TAU request message to the second network entity (e.g., through another context request message) to run an integrity check and to obtain the latest mapped EPS security context and to continue with the previous TAU procedure. For example, the first network entity may forward the second TAU request message to the second network entity (e.g., through the second context request message). The second network entity may verify the second TAU request message. The second network entity may then generate a new mapped EPS security context based on second TAU request message. For example, the new mapped EPS security context may be based, at least in part, on the 5G NAS Uplink COUNT value (e.g., six) associated with the second TAU request message. As a result, the mapped EPS security context provided to the first network entity including the new MME EPS key (e.g., $K_{ASME'}\_MME$) may be the same as the new mapped security context including the new UE EPS key ($K_{ASME'}\_UE2$). As a result, when the first network entity uses the new MME EPS key (e.g., $K_{ASME'}\_MME$) to integrity protect subsequent NAS messages (e.g., the TAU accept message), the UE may successfully perform the integrity verification on the subsequently received NAS messages (e.g., the TAU accept message). In some examples, the UE may update the security context of the UE from the mapped EPS security context to the new mapped EPS security context based on the deriving of the new mapped EPS security context.

Figure 14:
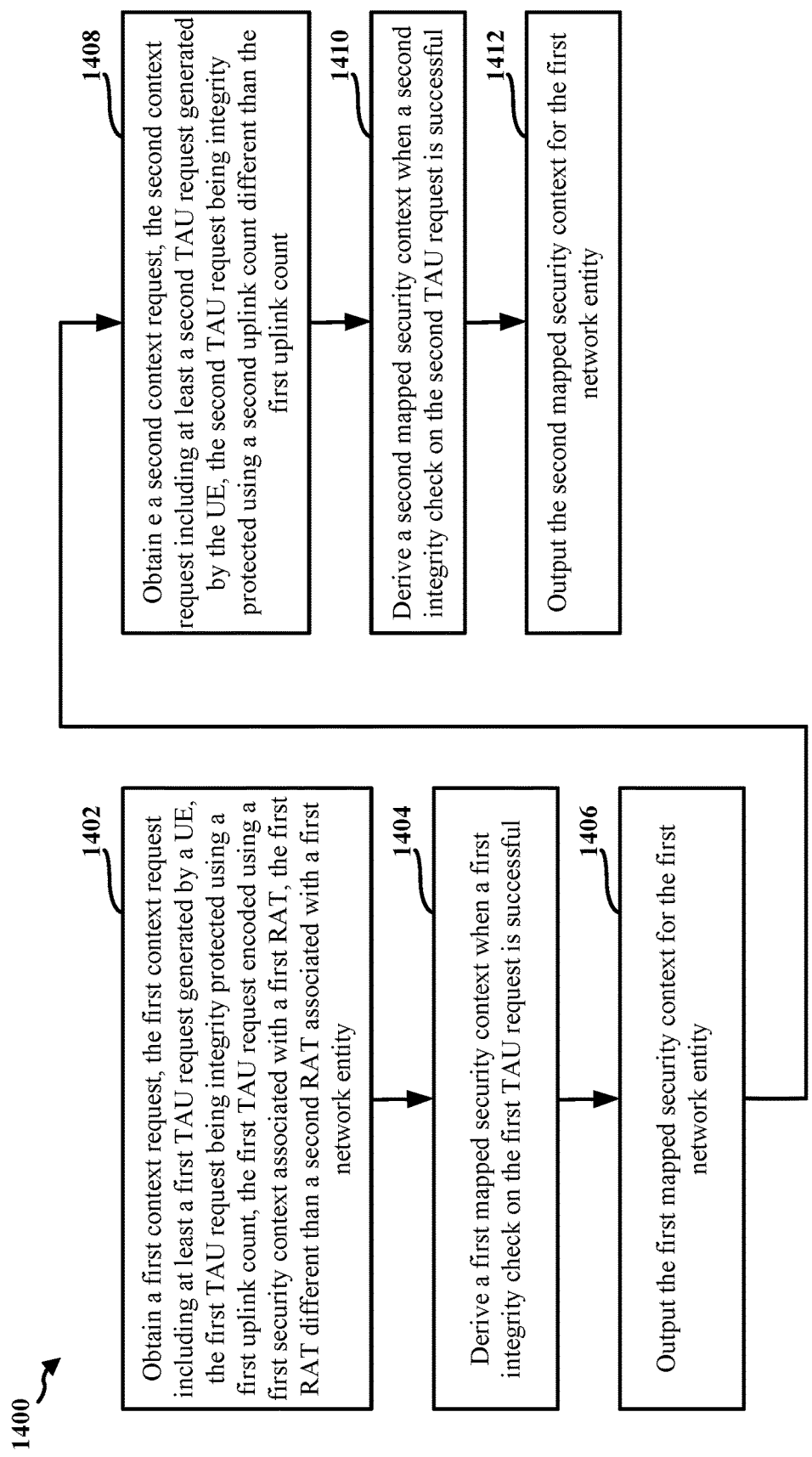
FIG. 14 is a flowchart of a method of wireless communication at a network entity, in accordance with the teachings disclosed herein.

FIG. 14 is a flowchart 1400 of a method of wireless communication. The method may be performed by a second network entity (e.g., the base station 102, or a component of the base station 102, the MME 412, the AMF 432, a network entity 1602 of FIG. 16, and/or a network entity 1760 of FIG. 17). The method may facilitate improving communication performance by improving security handling of first cell to second cell reselection in examples including RLF and retransmission of TAU request messages.

The second network entity may be in communication with a first network entity. In some examples, the first network entity may include an MME, such as the MME 606 of FIG. 6, and a second network entity may include an AMF, such as the AMF 608 of FIG. 6.

At 1402, the second network entity obtains a first context request, the first context request including at least a first TAU request generated by a UE, as described in connection with the context request message 622 of FIG. 6. The first TAU request may be encoded using a first security context associated with a first RAT, such as the 5G security context 690 of FIG. 6. The first TAU request may be integrity protected using a first uplink count based on the first security context, such as the 5G NAS uplink count associated with the first TAU request message 610. The first RAT may be different than a second RAT associated with a first network entity. For example, the first RAT may correspond to the 5G network 609 and the second RAT associated with the first network entity may correspond to the EPS network 607 associated with the MME 606 of FIG. 6. The obtaining of the first context request, at 1402, may be performed by the network security handling component 199 of the network entity 1602 of FIG. 16 and/or the network security handling component 497 of the network entity 1760 of FIG. 17.

At 1404, the second network entity derives a first mapped security context when a first integrity check on the first TAU request is successful, as described in connection with 632, 634, and the mapped EPS security context 636 of FIG. 6. The deriving of the first mapped security context, at 1404, may be performed by the network security handling component 199 of the network entity 1602 of FIG. 16 and/or the network security handling component 497 of the network entity 1760 of FIG. 17.

At 1406, the second network entity outputs the first mapped security context for the first network entity, as described in connection with the mapped EPS security context 636 and the context response message 638 of FIG. 6. The outputting of the first mapped security context, at 1406, may be performed by the network security handling component 199 of the network entity 1602 of FIG. 16 and/or the network security handling component 497 of the network entity 1760 of FIG. 17.

At 1408, the second network entity obtains a second context request, the second context request including at least a second TAU request generated by the UE, as described in connection with the second context request message 674 including a TAU request of FIG. 6. The second TAU request may be integrity protected using a second uplink count different than the first uplink count. For example, the first TAU request may be integrity protected using an uplink NAS count value of five and the second TAU request may be integrity protected using an uplink NAS count value of six. The obtaining of the second context request, at 1408, may be performed by the network security handling component 199 of the network entity 1602 of FIG. 16 and/or the network security handling component 497 of the network entity 1760 of FIG. 17.

At 1410, the second network entity derives a second mapped security context when a second integrity check on the second TAU request is successful. Aspects of deriving the second mapped security context may be similar to the deriving of the first mapped security context, as described in connection with 632, 634, and the mapped EPS security context 636 of FIG. 6. The deriving of the second mapped security context, at 1410, may be performed by the network security handling component 199 of the network entity 1602 of FIG. 16 and/or the network security handling component 497 of the network entity 1760 of FIG. 17.

At 1412, the second network entity outputs the second mapped security context for the first network entity. Aspects of outputting the second mapped security context may be similar to outputting the first mapped security context, as described in connection with the mapped EPS security context 636 and the context response message 638 of FIG. 6. The outputting of the second mapped security context, at 1412, may be performed by the network security handling component 199 of the network entity 1602 of FIG. 16 and/or the network security handling component 497 of the network entity 1760 of FIG. 17.

Figure 15:
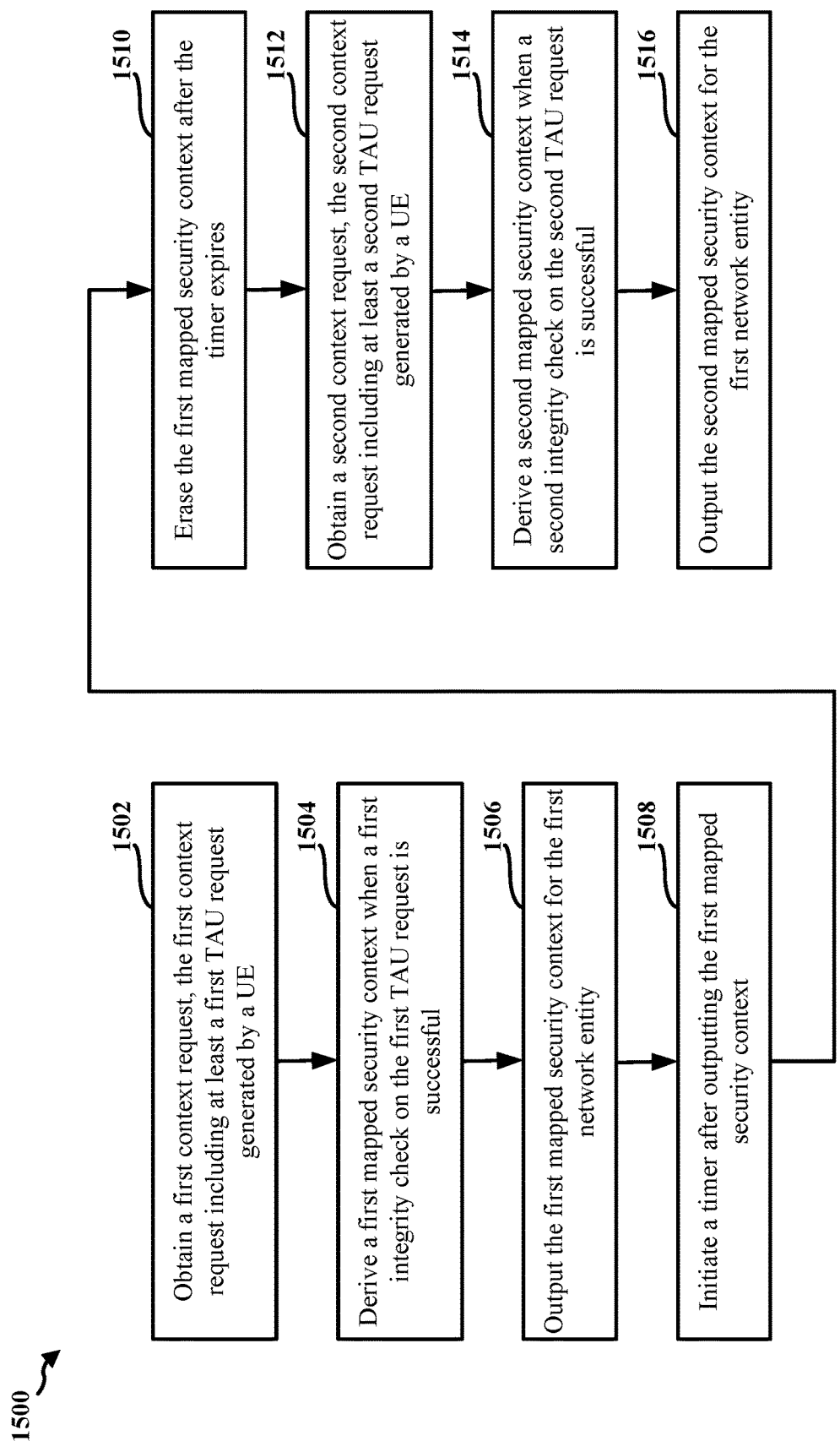
FIG. 15 is a flowchart of a method of wireless communication at a network entity, in accordance with the teachings disclosed herein.

FIG. 15 is a flowchart 1500 of a method of wireless communication. The method may be performed by a second network entity (e.g., the base station 102, or a component of the base station 102, the MME 412, the AMF 432, a network entity 1602 of FIG. 16, and/or a network entity 1760 of FIG. 17). The method may facilitate improving communication performance by improving security handling of first cell to second cell reselection in examples including RLF and retransmission of TAU request messages.

The second network entity may be in communication with a first network entity. In some examples, the first network entity may include an MME, such as the MME 606 of FIG. 6, and a second network entity may include an AMF, such as the AMF 608 of FIG. 6.

At 1502, the second network entity obtains a first context request, the first context request including at least a first TAU request generated by a UE, as described in connection with the context request message 622 of FIG. 6. The first TAU request may be encoded using a first security context associated with a first RAT, such as the 5G security context 690 of FIG. 6. The first TAU request may be integrity protected using a first uplink count based on the first security context, such as the 5G NAS uplink count associated with the first TAU request message 610. The first RAT may be different than a second RAT associated with a first network entity. For example, the first RAT may correspond to the 5G network 609 and the second RAT associated with the first network entity may correspond to the EPS network 607 associated with the MME 606 of FIG. 6. The obtaining of the first context request, at 1502, may be performed by the network security handling component 199 of the network entity 1602 of FIG. 16 and/or the network security handling component 497 of the network entity 1760 of FIG. 17.

In some examples, the first context request may further include an identifier mapped to the second RAT, such as the example mapped EPS GUTI 612 of FIG. 6.

At 1504, the second network entity derives a first mapped security context when a first integrity check on the first TAU request is successful, as described in connection with 632, 634, and the mapped EPS security context 636 of FIG. 6. The deriving of the first mapped security context, at 1504, may be performed by the network security handling component 199 of the network entity 1602 of FIG. 16 and/or the network security handling component 497 of the network entity 1760 of FIG. 17.

In some examples, the second network entity may perform the first integrity check on the first TAU request based on the first security context, as described in connection with 632 and the 5G NAS security context 692 of FIG. 6.

At 1506, the second network entity outputs the first mapped security context for the first network entity, as described in connection with the mapped EPS security context 636 and the context response message 638 of FIG. 6. The outputting of the first mapped security context, at 1506, may be performed by the network security handling component 199 of the network entity 1602 of FIG. 16 and/or the network security handling component 497 of the network entity 1760 of FIG. 17.

In some examples, at 1508, the second network entity may initiate a timer after transmitting the first mapped security context. The initiating of the timer, at 1508, may be performed by the network security handling component 199 of the network entity 1602 of FIG. 16 and/or the network security handling component 497 of the network entity 1760 of FIG. 17.

In some examples, at 1510, the second network entity may erase the first mapped security context after the timer expires. The erasing of the first mapped security context, at 1510, may be performed by the network security handling component 199 of the network entity 1602 of FIG. 16 and/or the network security handling component 497 of the network entity 1760 of FIG. 17.

At 1512, the second network entity obtains a second context request, the second context request including at least a second TAU request generated by the UE, as described in connection with the second context request message 674 including a TAU request of FIG. 6. The second TAU request may be integrity protected using a second uplink count different than the first uplink count. For example, the first TAU request may be integrity protected using an uplink NAS count value of five and the second TAU request may be integrity protected using an uplink NAS count value of six. The obtaining of the second context request, at 1512, may be performed by the network security handling component 199 of the network entity 1602 of FIG. 16 and/or the network security handling component 497 of the network entity 1760 of FIG. 17.

In some examples, the second TAU request may include a repetition of the first TAU request.

At 1514, the second network entity derives a second mapped security context when a second integrity check on the second TAU request is successful. Aspects of deriving the second mapped security context may be similar to the deriving of the first mapped security context, as described in connection with 632, 634, and the mapped EPS security context 636 of FIG. 6. The deriving of the second mapped security context, at 1514, may be performed by the network security handling component 199 of the network entity 1602 of FIG. 16 and/or the network security handling component 497 of the network entity 1760 of FIG. 17.

At 1516, the second network entity outputs the second mapped security context for the first network entity. Aspects of outputting the second mapped security context may be similar to outputting the first mapped security context, as described in connection with the mapped EPS security context 636 and the context response message 638 of FIG. 6. The outputting of the second mapped security context, at 1516, may be performed by the network security handling component 199 of the network entity 1602 of FIG. 16 and/or the network security handling component 497 of the network entity 1760 of FIG. 17.

Figure 16:
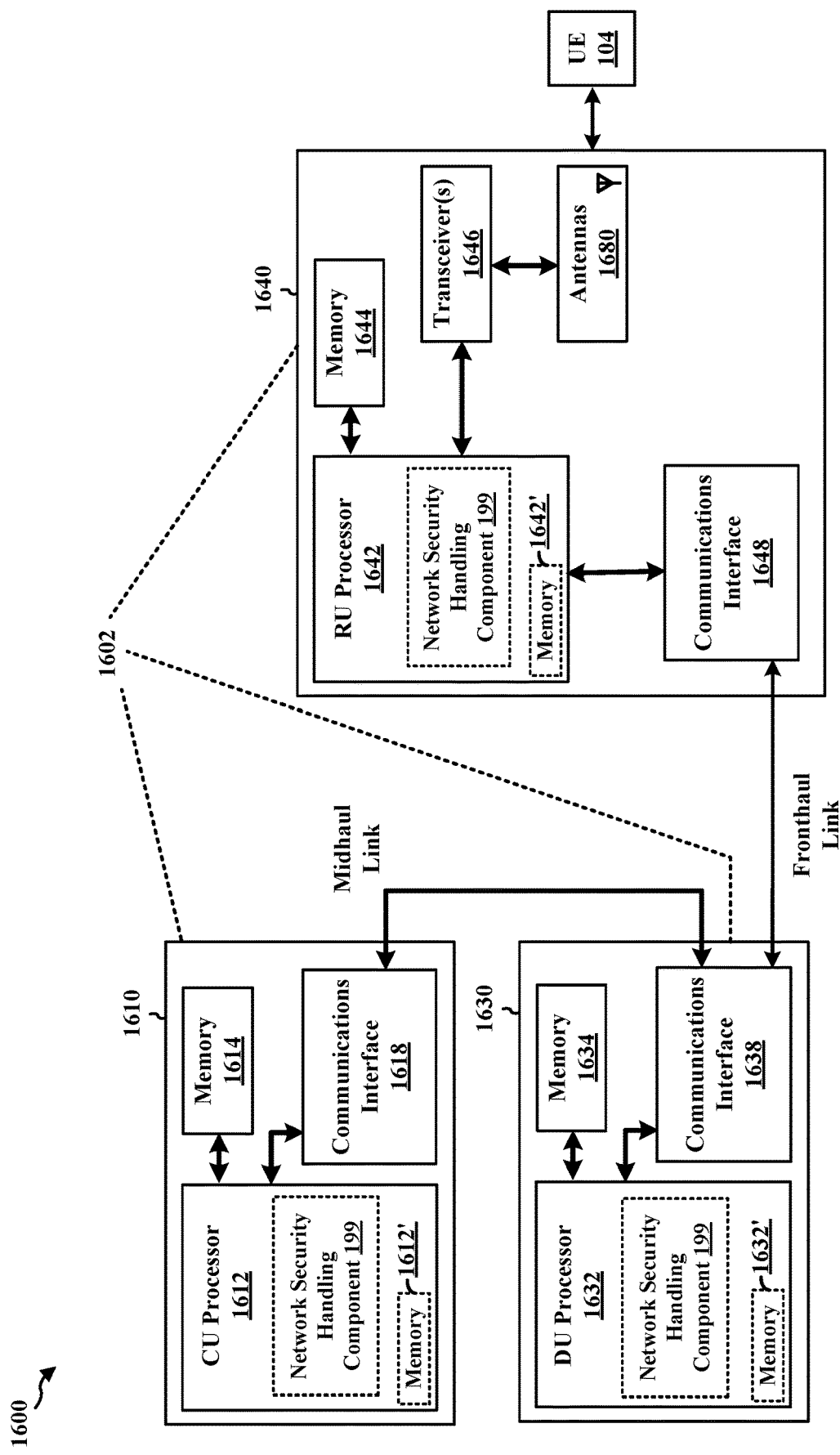
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the network security handling component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memories (e.g., the on-chip memory 1612', the on-chip memory 1632', and/or the on-chip memory 1642') and/or the additional memory modules (e.g., the additional memory modules 1614, the additional memory modules 1634, and/or the additional memory modules 1644) may each be considered a computer-readable medium/memory. Each computer-readable medium/memory may be non-transitory. Each of the CU processor 1612, the DU processor 1632, the RU processor 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the network security handling component 199 is configured to: receive a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; output, based on the first TAU request, a first context request for a second network entity, the second network entity associated with the first RAT; receive, based on the first context request, a first mapped security context, the first mapped security context derived from the first security context and the first uplink count; receive a second TAU request, the second TAU request encoded using the first security context, the second TAU request being integrity protected using a second uplink count that is different than the first uplink count, and the second TAU request including the first set of information; output, based on the second TAU request, a second context request for the second network entity; receive, based on the second context request, a second mapped security context, the second mapped security context derived from the first security context and the second uplink count; and transmit a downlink message based on the second mapped security context.

In another aspect, the network security handling component 199 may be configured to: receive a first context request, the first context request including at least a first tracking area update (TAU) request generated by a user equipment (UE), the first TAU request being integrity protected using a first uplink count, the first TAU request encoded using a first security context associated with a first radio access technology (RAT), the first RAT different than a second RAT associated with a first network entity; derive a first mapped security context when a first integrity check on the first TAU request is successful; output the first mapped security context for the first network entity; receive a second context request, the second context request including at least a second TAU request generated by the UE, the second TAU request being integrity protected using a second uplink count different than the first uplink count; derive a second mapped security context when a second integrity check on the second TAU request is successful; and output the second mapped security context for the first network entity.

The network security handling component 199 may be within one or more processors of one or more of the CU 1610, DU 1630, and the RU 1640. The network security handling component 199 may be one or more hardware components specifically configured to carry out the stated processes/algorithm, implemented by one or more processors configured to perform the stated processes/algorithm, stored within a computer-readable medium for implementation by one or more processors, or some combination thereof.

In one configuration, the network entity 1602 may be a first network entity and includes means for obtaining a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; outputting, based on the first TAU request, a first context request for a second network entity, the second network entity associated with the first RAT; obtaining, based on the first context request, a first mapped security context, the first mapped security context derived from the first security context and the first uplink count; obtaining a second TAU request, the second TAU request encoded using the first security context, the second TAU request being integrity protected using a second uplink count that is different than the first uplink count, and the second TAU request including the first set of information; outputting, based on the second TAU request, a second context request for the second network entity; obtaining, based on the second context request, a second mapped security context, the second mapped security context derived from the first security context and the second uplink count; and outputting a downlink message based on the second mapped security context.

In another configuration, the first context request includes the identifier mapped to the second RAT and the first TAU request is integrity protected using the first uplink count.

In another configuration, the example network entity 1602 also includes means for deriving an address of the second network entity based on the identifier mapped to the second RAT.

In another configuration, the example network entity 1602 also includes means for updating, based on obtaining the second mapped security context, a security context of the first network entity from the first mapped security context to the second mapped security context; and discarding, after updating the security context of the first network entity, pending downlink transmissions that are integrity protected using the first mapped security context.

In another configuration, the second TAU request comprises a repetition of the first TAU request.

In another configuration, the first TAU request is obtained based on a non-inter-system change from an N1 mode to an S1 mode, the UE is configured to operate in a single-registration mode, and the downlink message includes a TAU accept message, and the example network entity 1602 also includes means for resending the downlink message.

In another configuration, the example network entity 1602 also includes means for restarting a T3450 timer when a TAU complete message is expected from the UE; and skipping incrementing a retransmission counter related to the T3450 timer.

In another configuration, the first TAU request is obtained based on an inter-system change from an N1 mode to an S1 mode, the UE is configured to operate in a single-registration mode, and the downlink message includes a TAU accept message, and the example network entity 1602 also includes means for initiating an authentication procedure; and performing a security mode control procedure to transition a new partial native evolved packet system (EPS) security In another configuration, the example network entity 1602 also includes means for outputting a downlink message repetition when the security mode control procedure is successful, the downlink message repetition being integrity protected using the current full native EPS security context; restarting a T3450 timer when a TAU complete message is expected from the UE; and skipping incrementing a retransmission counter related to the T3450 timer.

In another configuration, the first TAU request is obtained based on a non-inter-system change from an N1 mode to an S1 mode, the UE is configured to operate in a single-registration mode, and the example network entity 1602 also includes means for skipping initiating of a TAU procedure based on the second TAU request; and integrity protecting the downlink message based on the first mapped security context.

In another configuration, the first TAU request is obtained based on an inter-system change from an N1 mode to an S1 mode, the UE is configured to operate in a single-registration mode, and the example network entity 1602 also includes means for determining to initiate a second TAU procedure including: outputting the second context request to the second network entity; and integrity protecting the downlink message based on the second mapped security context.

In another configuration, the first network entity includes a Mobility Management Entity (MME) and the second network entity includes an Access and Mobility Management Function (AMF).

In one configuration, the network entity 1602 may be a second network entity and includes means for obtaining a first context request, the first context request including at least a first tracking area update (TAU) request generated by a user equipment (UE), the first TAU request being integrity protected using a first uplink count, the first TAU request encoded using a first security context associated with a first radio access technology (RAT), the first RAT different than a second RAT associated with a first network entity; deriving a first mapped security context when a first integrity check on the first TAU request is successful; outputting the first mapped security context for the first network entity; obtaining a second context request, the second context request including at least a second TAU request generated by the UE, the second TAU request being integrity protected using a second uplink count different than the first uplink count; deriving a second mapped security context when a second integrity check on the second TAU request is successful; and outputting the second mapped security context for the first network entity.

In another configuration, the first context request further includes an identifier mapped to the second RAT.

In another configuration, the second TAU request comprises a repetition of the first TAU request.

In another configuration, the example network entity 1602 also includes means for initiating a timer after outputting the first mapped security context; and erasing the first mapped security context after the timer expires.

In another configuration, the example network entity 1602 also includes means for performing the first integrity check on the first TAU request based on the first security context.

In another configuration, the first network entity includes a Mobility Management Entity (MME) and the second network entity includes an Access and Mobility Management Function (AMF).

The means may be the network security handling component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Figure 17:
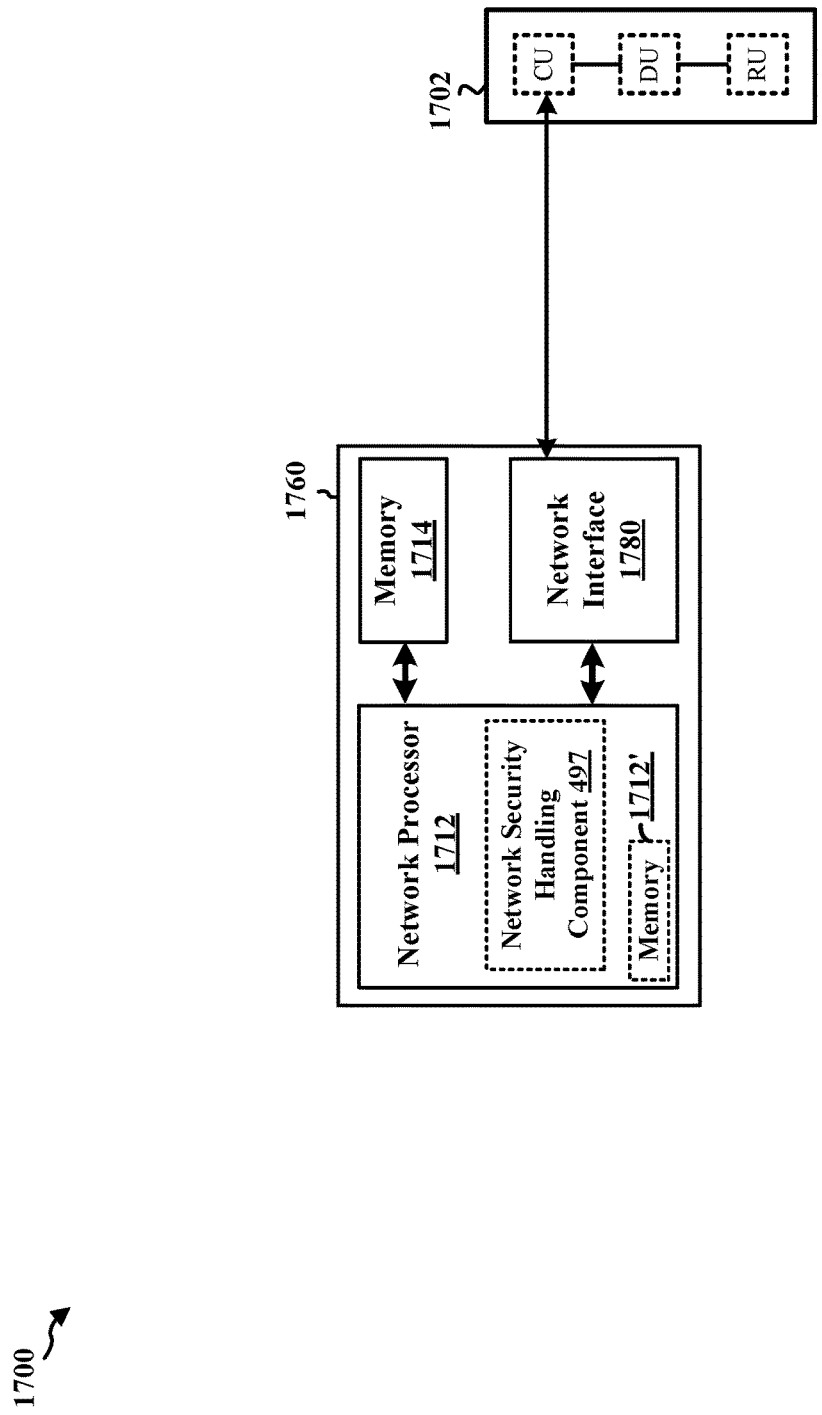
FIG. 17 is a diagram illustrating an example of a hardware implementation for an example network entity.

FIG. 17 is a diagram 1700 illustrating an example of a hardware implementation for a network entity 1760. In one example, the network entity 1760 may be within the core network 120. The network entity 1760 may include a network processor 1712. The network processor 1712 may include on-chip memory 1712'. In some aspects, the network entity 1760 may further include additional memory modules 1714. The network entity 1760 communicates via the network interface 1780 directly (e.g., backhaul link) or indirectly (e.g., through a RIC) with the CU 1702. The on-chip memory 1712' and the additional memory modules 1714 may each be considered a computer-readable medium/memory. Each computer-readable medium/memory may be non-transitory. The network processor 1712 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the network security handling component 497 is configured to: receive a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; output, based on the first TAU request, a first context request for a second network entity, the second network entity associated with the first RAT; receive, based on the first context request, a first mapped security context, the first mapped security context derived from the first security context and the first uplink count; receive a second TAU request, the second TAU request encoded using the first security context, the second TAU request being integrity protected using a second uplink count that is different than the first uplink count, and the second TAU request including the first set of information; output, based on the second TAU request, a second context request for the second network entity; receive, based on the second context request, a second mapped security context, the second mapped security context derived from the first security context and the second uplink count; and transmit a downlink message based on the second mapped security context.

In another aspect, the network security handling component 497 may be configured to: receive a first context request, the first context request including at least a first tracking area update (TAU) request generated by a user equipment (UE), the first TAU request being integrity protected using a first uplink count, the first TAU request encoded using a first security context associated with a first radio access technology (RAT), the first RAT different than a second RAT associated with a first network entity; derive a first mapped security context when a first integrity check on the first TAU request is successful; output the first mapped security context for the first network entity; receive a second context request, the second context request including at least a second TAU request generated by the UE, the second TAU request being integrity protected using a second uplink count different than the first uplink count; derive a second mapped security context when a second integrity check on the second TAU request is successful; and output the second mapped security context for the first network entity.

The network security handling component 497 may be within the network processor 1712. The network security handling component 497 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1760 may include a variety of components configured for various functions.

In one configuration, the network entity 1760 may be a first network entity and includes means for obtaining a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; outputting, based on the first TAU request, a first context request for a second network entity, the second network entity associated with the first RAT; obtaining, based on the first context request, a first mapped security context, the first mapped security context derived from the first security context and the first uplink count; obtaining a second TAU request, the second TAU request encoded using the first security context, the second TAU request being integrity protected using a second uplink count that is different than the first uplink count, and the second TAU request including the first set of information; outputting, based on the second TAU request, a second context request for the second network entity; obtaining, based on the second context request, a second mapped security context, the second mapped security context derived from the first security context and the second uplink count; and outputting a downlink message based on the second mapped security context.

In another configuration, the first context request includes the identifier mapped to the second RAT and the first TAU request is integrity protected using the first uplink count.

In another configuration, the example network entity 1760 also includes means for deriving an address of the second network entity based on the identifier mapped to the second RAT.

In another configuration, the example network entity 1760 also includes means for updating, based on obtaining the second mapped security context, a security context of the first network entity from the first mapped security context to the second mapped security context; and discarding, after updating the security context of the first network entity, pending downlink transmissions that are integrity protected using the first mapped security context.

In another configuration, the second TAU request comprises a repetition of the first TAU request.

In another configuration, the first TAU request is obtained based on a non-inter-system change from an N1 mode to an S1 mode, the UE is configured to operate in a single-registration mode, and the downlink message includes a TAU accept message, and the example network entity 1760 also includes means for resending the downlink message.

In another configuration, the example network entity 1760 also includes means for restarting a T3450 timer when a TAU complete message is expected from the UE; and skipping incrementing a retransmission counter related to the T3450 timer.

In another configuration, the first TAU request is obtained based on an inter-system change from an N1 mode to an S1 mode, the UE is configured to operate in a single-registration mode, and the downlink message includes a TAU accept message, and the example network entity 1760 also includes means for initiating an authentication procedure; and performing a security mode control procedure to transition a new partial native evolved packet system (EPS) security In another configuration, the example network entity 1760 also includes means for outputting a downlink message repetition when the security mode control procedure is successful, the downlink message repetition being integrity protected using the current full native EPS security context; restarting a T3450 timer when a TAU complete message is expected from the UE; and skipping incrementing a retransmission counter related to the T3450 timer.

In another configuration, the first TAU request is obtained based on a non-inter-system change from an N1 mode to an S1 mode, the UE is configured to operate in a single-registration mode, and the example network entity 1760 also includes means for skipping initiating of a TAU procedure based on the second TAU request; and integrity protecting the downlink message based on the first mapped security context.

In another configuration, the first TAU request is obtained based on an inter-system change from an N1 mode to an S1 mode, the UE is configured to operate in a single-registration mode, and the example network entity 1760 also includes means for determining to initiate a second TAU procedure including: outputting the second context request to the second network entity; and integrity protecting the downlink message based on the second mapped security context.

In another configuration, the first network entity includes a Mobility Management Entity (MME) and the second network entity includes an Access and Mobility Management Function (AMF).

In one configuration, the network entity 1760 may be a second network entity and includes means for obtaining a first context request, the first context request including at least a first tracking area update (TAU) request generated by a user equipment (UE), the first TAU request being integrity protected using a first uplink count, the first TAU request encoded using a first security context associated with a first radio access technology (RAT), the first RAT different than a second RAT associated with a first network entity; deriving a first mapped security context when a first integrity check on the first TAU request is successful; outputting the first mapped security context for the first network entity; obtaining a second context request, the second context request including at least a second TAU request generated by the UE, the second TAU request being integrity protected using a second uplink count different than the first uplink count; deriving a second mapped security context when a second integrity check on the second TAU request is successful; and outputting the second mapped security context for the first network entity.

In another configuration, the first context request further includes an identifier mapped to the second RAT.

In another configuration, the second TAU request comprises a repetition of the first TAU request.

In another configuration, the example network entity 1760 also includes means for initiating a timer after outputting the first mapped security context; and erasing the first mapped security context after the timer expires.

In another configuration, the example network entity 1760 also includes means for performing the first integrity check on the first TAU request based on the first security context.

In another configuration, the first network entity includes a Mobility Management Entity (MME) and the second network entity includes an Access and Mobility Management Function (AMF).

The means may be the network security handling component 497 of the network entity 1760 configured to perform the functions recited by the means. As described supra, the network entity 1760 may include the network processor 1712. As such, in one configuration, the means may be the network processor 1712 configured to perform the functions recited by the means.

Examples disclosed herein provide techniques for removing inconsistencies in the handling of repetitions of TAU request messages as described above. For example, disclosed techniques may remove inconsistencies by modifying how the network handles a repetition of a TAU request message. Disclosed techniques may additionally or alternatively remove inconsistencies by modifying how the UE integrity protects the TAU request messages. Additionally, disclosed techniques may remove inconsistences by modifying how the UE performs integrity verification of messages.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: transmitting, to a first network entity, a first tracking area update (TAU) request, the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; transmitting, to the first network entity, a second TAU request, the second TAU request including the first set of information, the second TAU request being integrity protected using a second uplink count; deriving a mapped security context based on the first security context and at least one of the first uplink count or the second uplink count; and communicating with the first network entity based on the mapped security context.

Aspect 2 is the method of aspect 1, further including: transmitting the first TAU request when performing a change from a first cell associated with the first RAT to connect to a second cell associated with the second RAT, the second RAT being different than the first RAT, the first network entity being associated with the second RAT.

Aspect 3 is the method of any of aspects 1 and 2, further including that the second TAU request comprises a repetition of the first TAU request, and the second uplink count is a same value as the first uplink count.

Aspect 4 is the method of any of aspects 1 to 3, further including: transmitting the second TAU request based on an occurrence of a radio link failure.

Aspect 5 is the method of any of aspects 1 and 2, further including that the mapped security context is associated with the second RAT.

Aspect 6 is the method of any of aspects 1 and 2, further including that the second uplink count is different than the first uplink count and the mapped security context is a first mapped security context, the method further including: deriving a second mapped security context based on the first security context and the first uplink count, the second TAU request encoded using the first security context and being integrity protected using the second uplink count, the first mapped security context being derived based on the first security context and the second uplink count.

Aspect 7 is the method of any of aspects 1 and 6, further including: updating, based on deriving the first mapped security context, a security context of the UE from the second mapped security context to the first mapped security context; and discarding, after updating the security context of the UE, pending transmissions that are integrity protected using the second mapped security context.

Aspect 8 is the method of any of aspects 1, 6 and 7, further including that the second TAU request comprises a repetition of the first TAU request.

Aspect 9 is an apparatus for wireless communication at a UE including at least one processor coupled to a memory and configured to implement any of aspects 1 to 8.

In aspect 10, the apparatus of aspect 9 further includes at least one antenna coupled to the at least one processor.

In aspect 11, the apparatus of aspect 9 or 10 further includes a transceiver coupled to the at least one processor.

Aspect 12 is an apparatus for wireless communication including means for implementing any of aspects 1 to 8.

In aspect 13, the apparatus of aspect 12 further includes at least one antenna coupled to the means to perform the method of any of aspects 1 to 8.

In aspect 14, the apparatus of aspect 12 or 13 further includes a transceiver coupled to the means to perform the method of any of aspects 1 to 8.

Aspect 15 is a non-transitory computer-readable storage medium storing computer executable code, where the code, when executed, causes a processor to implement any of aspects 1 to 8.

Aspect 16 is a method of wireless communication at a UE, including: transmitting, to a first network entity, a first tracking area update (TAU) request when performing a change from a first cell associated with a first radio access technology (RAT) to connect to a second cell associated with a second RAT different than the first RAT, the first network entity associated with the second RAT, the first TAU request encoded using a first security context associated with the first RAT, and the first TAU request being integrity protected using a first uplink count based on the first security context; deriving a first integrity key based on the first security context, the first uplink count, and a first mapped security context; transmitting, to the first network entity, a repetition of the first TAU request, the repetition of the first TAU request being integrity protected using a second uplink count that is different than the first uplink count; deriving a second integrity key based on the first security context, the second uplink count, and a second mapped security context; receiving, from the first network entity, a downlink transmission; performing an integrity check on the downlink transmission using at least one of the first integrity key and the second integrity key; and setting a master security key of the UE when the integrity check on the downlink transmission is successful using a derived integrity key, the master security key being set based on the first mapped security context or the second mapped security context used to derive the derived integrity key.

Aspect 17 is the method of aspect 16, further including: erasing the second mapped security context and any keys derived using the second mapped security context when the integrity check on the downlink transmission is successful using the first integrity key, where the master security key comprises the first mapped security context.

Aspect 18 is the method of aspect 16, further including: erasing the first mapped security context and any keys derived using the first mapped security context when the integrity check on the downlink transmission is successful using the second integrity key, where the master security key comprises the second mapped security context.

Aspect 19 is the method of any of aspects 16 to 18, further including: deriving the first mapped security context based on the first security context and the first uplink count.

Aspect 20 is an apparatus for wireless communication at a UE including at least one processor coupled to a memory and configured to implement any of aspects 16 to 19.

In aspect 21, the apparatus of aspect 20 further includes at least one antenna coupled to the at least one processor.

In aspect 22, the apparatus of aspect 20 or 21 further includes a transceiver coupled to the at least one processor.

Aspect 23 is an apparatus for wireless communication including means for implementing any of aspects 16 to 19.

In aspect 24, the apparatus of aspect 23 further includes at least one antenna coupled to the means to perform the method of any of aspects 16 to 19.

In aspect 25, the apparatus of aspect 23 or 24 further includes a transceiver coupled to the means to perform the method of any of aspects 16 to 19.

Aspect 26 is a non-transitory computer-readable storage medium storing computer executable code, where the code, when executed, causes a processor to implement any of aspects 16 to 19.

Aspect 27 is a method of wireless communication at a first network entity, including: obtaining a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information including an identifier mapped to a second RAT associated with the first network entity; outputting, based on the first TAU request, a first context request for a second network entity, the second network entity associated with the first RAT; obtaining, based on the first context request, a first mapped security context, the first mapped security context derived from the first security context and the first uplink count; obtaining a second TAU request, the second TAU request encoded using the first security context, the second TAU request being integrity protected using a second uplink count that is different than the first uplink count, and the second TAU request including the first set of information; outputting, based on the second TAU request, a second context request for the second network entity; obtaining, based on the second context request, a second mapped security context, the second mapped security context derived from the first security context and the second uplink count; and outputting a downlink message based on the second mapped security context.

Aspect 28 is the method of aspect 27, further including that the first context request includes the identifier mapped to the second RAT and the first TAU request is integrity protected using the first uplink count.

Aspect 29 is the method of any of aspects 27 and 28, further including: deriving an address of the second network entity based on the identifier mapped to the second RAT.

Aspect 30 is the method of any of aspects 27 to 29, further including: updating, based on obtaining the second mapped security context, a security context of the first network entity from the first mapped security context to the second mapped security context; and discarding, after updating the security context of the first network entity, pending downlink transmissions that are integrity protected using the first mapped security context.

Aspect 31 is the method of any of aspects 27 to 30, further including that the second TAU request comprises a repetition of the first TAU request.

Aspect 32 is the method of any of aspects 27 to 31, further including that the first TAU request is obtained based on a non-inter-system change from an N1 mode to an S1 mode, the UE is configured to operate in a single-registration mode, and the downlink message includes a TAU accept message, and the method further includes: resending the downlink message.

Aspect 33 is the method of any of aspects 27 to 32, further including: restarting a T3450 timer when a TAU complete message is expected from the UE; and skipping incrementing a retransmission counter related to the T3450 timer.

Aspect 34 is the method of any of aspects 27 to 31, further including that the first TAU request is obtained based on an inter-system change from an N1 mode to an S1 mode, the UE is configured to operate in a single-registration mode, and the downlink message includes a TAU accept message, and the method further includes: initiating an authentication procedure; and performing a security mode control procedure to transition a new partial native evolved packet system (EPS) security context into a current full native EPS security context.

Aspect 35 is the method of any of aspects 27 and 34, further including: outputting a downlink message repetition when the security mode control procedure is successful, the downlink message repetition being integrity protected using the current full native EPS security context; restarting a T3450 timer when a TAU complete message is expected from the UE; and skipping incrementing a retransmission counter related to the T3450 timer.

Aspect 36 is the method of any of aspects 27 to 31, further including that the first TAU request is obtained based on a non-inter-system change from an N1 mode to an S1 mode, the UE is configured to operate in a single-registration mode, and the method further includes: skipping initiating of a TAU procedure based on the second TAU request; and integrity protecting the downlink message based on the first mapped security context.

Aspect 37 is the method of any of aspects 27 to 31, further including that the first TAU request is obtained based on an inter-system change from an N1 mode to an S1 mode, the UE is configured to operate in a single-registration mode, and the method further includes: determining to initiate a second TAU procedure including: outputting the second context request to the second network entity; and integrity protecting the downlink message based on the second mapped security context.

Aspect 38 is the method of any of aspects 27 to 37, further including that the first network entity includes a Mobility Management Entity (MME) and the second network entity includes an Access and Mobility Management Function (AMF).

Aspect 39 is an apparatus for wireless communication at a UE including at least one processor coupled to a memory and configured to implement any of aspects 27 to 38.

In aspect 40, the apparatus of aspect 39 further includes at least one antenna coupled to the at least one processor.

In aspect 41, the apparatus of aspect 39 or 40 further includes a transceiver coupled to the at least one processor.

Aspect 42 is an apparatus for wireless communication including means for implementing any of aspects 27 to 38.

In aspect 43, the apparatus of aspect 42 further includes at least one antenna coupled to the means to perform the method of any of aspects 27 to 38.

In aspect 44, the apparatus of aspect 42 or 43 further includes a transceiver coupled to the means to perform the method of any of aspects 27 to 38.

Aspect 45 is a non-transitory computer-readable storage medium storing computer executable code, where the code, when executed, causes a processor to implement any of aspects 27 to 38.

Aspect 46 is a method of wireless communication at a second network entity, including: obtaining a first context request, the first context request including at least a first tracking area update (TAU) request generated by a user equipment (UE), the first TAU request being integrity protected using a first uplink count, the first TAU request encoded using a first security context associated with a first radio access technology (RAT), the first RAT different than a second RAT associated with a first network entity; deriving a first mapped security context when a first integrity check on the first TAU request is successful; outputting the first mapped security context for the first network entity; obtaining a second context request, the second context request including at least a second TAU request generated by the UE, the second TAU request being integrity protected using a second uplink count different than the first uplink count; deriving a second mapped security context when a second integrity check on the second TAU request is successful; and outputting the second mapped security context for the first network entity.

Aspect 47 is the method of aspect 46, further including that the first context request further includes an identifier mapped to the second RAT.

Aspect 48 is the method of any of aspects 46 and 47, further including that the second TAU request comprises a repetition of the first TAU request.

Aspect 49 is the method of any of aspects 46 to 48, further including: initiating a timer after outputting the first mapped security context; and erasing the first mapped security context after the timer expires.

Aspect 50 is the method of any of aspects 46 to 49, further including: performing the first integrity check on the first TAU request based on the first security context.

Aspect 51 is the method of any of aspects 46 to 50, further including that the first network entity includes a Mobility Management Entity (MME) and the second network entity includes an Access and Mobility Management Function (AMF).

Aspect 52 is an apparatus for wireless communication at a UE including at least one processor coupled to a memory and configured to implement any of aspects 46 to 51.

In aspect 53, the apparatus of aspect 52 further includes at least one antenna coupled to the at least one processor.

In aspect 54, the apparatus of aspect 52 or 53 further includes a transceiver coupled to the at least one processor.

Aspect 55 is an apparatus for wireless communication including means for implementing any of aspects 46 to 51.

In aspect 56, the apparatus of aspect 55 further includes at least one antenna coupled to the means to perform the method of any of aspects 46 to 51.

In aspect 57, the apparatus of aspect 55 or 56 further includes a transceiver coupled to the means to perform the method of any of aspects 46 to 51.

Aspect 58 is a non-transitory computer-readable storage medium storing computer executable code, where the code, when executed, causes a processor to implement any of aspects 46 to 51.

What is claimed is:

1. An apparatus for wireless communication at a user equipment (UE), comprising:
   a memory; and
   at least one processor coupled to the memory and configured to:
      transmit, to a first network entity, a first tracking area update (TAU) request, the first TAU request encoded using a first security context associated with a first radio access technology (RAT), the first TAU request being integrity protected using a first uplink count based on the first security context, and the first TAU request including a first set of information comprising a mapped Evolved Packet System (EPS) Globally Unique Temporary UE Identity (EPS GUTI), an EPS key set identifier (eKSI), and a non-access stratum Message Authentication Code (NAS-MAC);
      transmit, to the first network entity in response to a radio link failure, a second TAU request, the second TAU request including the first set of information, wherein the first set of information comprises the EPS GUTI, the eKSI, and the NAS-MAC included in the first TAU request, the second TAU request being integrity protected using a second uplink count;
      derive a mapped security context based on the first security context and at least one of the first uplink count or the second uplink count; and
      communicate with the first network entity based on the mapped security context.

2. The apparatus of claim 1, further comprising:
   at least one antenna coupled to the at least one processor, wherein the at least one processor coupled to the memory is configured to transmit the first TAU request when performing a change from a first cell associated with the first RAT to connect to a second cell associated with the second RAT, the second RAT being different than the first RAT, the first network entity being associated with the second RAT.

3. The apparatus of claim 2, wherein the second TAU request comprises a repetition of the first TAU request, and the second uplink count is a same value as the first uplink count.

4. The apparatus of claim 2, wherein the mapped security context is associated with the second RAT.

5. The apparatus of claim 1, wherein the second uplink count is different than the first uplink count and the mapped security context is a first mapped security context, the at least one processor coupled to the memory further configured to:
derive a second mapped security context based on the first security context and the first uplink count, the second TAU request encoded using the first security context and being integrity protected using the second uplink count, the first mapped security context being derived based on the first security context and the second uplink count.

6. The apparatus of claim 5, wherein the at least one processor coupled to the memory is further configured to:
update, based on deriving the first mapped security context, a security context of the UE from the second mapped security context to the first mapped security context; and
discard, after updating the security context of the UE, pending transmissions that are integrity protected using the second mapped security context.

7. The apparatus of claim 5, wherein the second TAU request comprises a repetition of the first TAU request.

8. An apparatus for wireless communication at a user equipment (UE), comprising:
a memory; and
at least one processor coupled to the memory and configured to:
transmit, to a first network entity, a first tracking area update (TAU) request when performing a change from a first cell associated with a first radio access technology (RAT) to connect to a second cell associated with a second RAT different than the first RAT, the first network entity associated with the second RAT, the first TAU request encoded using a first security context associated with the first RAT, and the first TAU request being integrity protected using a first uplink count based on the first security context;
derive a first integrity key based on the first security context, the first uplink count, and a first mapped security context;
transmit, to the first network entity, a repetition of the first TAU request, the repetition of the first TAU request being integrity protected using a second uplink count that is different than the first uplink count;
derive a second integrity key based on the first security context, the second uplink count, and a second mapped security context;
receive, from the first network entity, a downlink transmission;
perform an integrity check on the downlink transmission using at least one of the first integrity key and the second integrity key; and
set a master security key of the UE and erase the first mapped security context or the second mapped security context and any keys derived using the first mapped security context or any keys derived using the second mapped security context when the integrity check on the downlink transmission is successful using a derived integrity key, the master security key being set based on the first mapped security context or the second mapped security context used to derive the derived integrity key.

9. The apparatus of claim 8, further comprising:
at least one antenna coupled to the at least one processor, wherein the master security key comprises the first mapped security context.

10. The apparatus of claim 8, wherein the master security key comprises the second mapped security context.

11. The apparatus of claim 8, wherein the at least one processor coupled to the memory is further configured to:
derive the first mapped security context based on the first security context and the first uplink count.

12. An apparatus for wireless communication at a first network entity, comprising:
a memory; and
at least one processor coupled to the memory and configured to:
obtain a first tracking area update (TAU) request generated by a user equipment (UE), the first TAU request encoded using a first security context associated with a first radio access technology (RAT), the first TAU request being integrity protected using a first uplink count based on the first security context, and the first TAU request including a first set of information comprising a mapped Evolved Packet System (EPS) Globally Unique Temporary UE Identity (EPS GUTI), an EPS key set identifier (eKSI), and a non-access stratum Message Authentication Code (NAS-MAC);
output, based on the first TAU request, a first context request for a second network entity, the second network entity associated with the first RAT;
obtain, based on the first context request, a first mapped security context, the first mapped security context derived from the first security context and the first uplink count;
obtain a second TAU request, the second TAU request encoded using the first security context, the second TAU request being integrity protected using a second uplink count that is different than the first uplink count, and the second TAU request including the first set of information comprising the EPS GUTI, the eKSI, and the NAS-MAC included in the first TAU request;
output, based on the second TAU request, a second context request for the second network entity;
obtain, based on the second context request, a second mapped security context, the second mapped security context derived from the first security context and the second uplink count; and
output a downlink message based on the second mapped security context.

13. The apparatus of claim 12, wherein the first context request includes the identifier mapped to the second RAT and the first TAU request is integrity protected using the first uplink count.

14. The apparatus of claim 12, further comprising:
at least one antenna coupled to the at least one processor, the at least one processor coupled to the memory further configured to:
derive an address of the second network entity based on the identifier mapped to the second RAT.

15. The apparatus of claim 12, wherein the at least one processor coupled to the memory is further configured to:
update, based on obtaining the second mapped security context, a security context of the first network entity from the first mapped security context to the second mapped security context; and
discard, after updating the security context of the first network entity, pending downlink transmissions that are integrity protected using the first mapped security context.

16. The apparatus of claim 12, wherein the second TAU request comprises a repetition of the first TAU request.

17. The apparatus of claim 12, wherein the first TAU request is obtained based on a non-inter-system change from an N1 mode to an S1 mode, the UE is configured to operate in a single-registration mode, and the downlink message includes a TAU accept message, and wherein the at least one processor coupled to the memory is further configured to:
resend the downlink message.

18. The apparatus of claim 17, wherein the at least one processor coupled to the memory is further configured to:
restart a T3450 timer when a TAU complete message is expected from the UE; and
skip incrementing a retransmission counter related to the T3450 timer.

19. The apparatus of claim 12, wherein the first TAU request is obtained based on an inter-system change from an N1 mode to an S1 mode, the UE is configured to operate in a single-registration mode, and the downlink message includes a TAU accept message, and wherein the at least one processor coupled to the memory is further configured to:
initiate an authentication procedure; and
perform a security mode control procedure to transition a new partial native evolved packet system (EPS) security context into a current full native EPS security context.

20. The apparatus of claim 19, wherein the at least one processor coupled to the memory is further configured to:
output a downlink message repetition when the security mode control procedure is successful, the downlink message repetition being integrity protected using the current full native EPS security context;
restart a T3450 timer when a TAU complete message is expected from the UE; and
skip incrementing a retransmission counter related to the T3450 timer.

21. The apparatus of claim 12, wherein the first TAU request is obtained based on a non-inter-system change from an N1 mode to an S1 mode, the UE is configured to operate in a single-registration mode, and wherein the at least one processor coupled to the memory is further configured to:
skip initiating of a TAU procedure based on the second TAU request; and
integrity protect the downlink message based on the first mapped security context.

22. The apparatus of claim 12, wherein the first TAU request is obtained based on an inter-system change from an N1 mode to an S1 mode, the UE is configured to operate in a single-registration mode, and wherein the at least one processor coupled to the memory is further configured to:
determine to initiate a second TAU procedure including:
outputting the second context request to the second network entity; and
integrity protecting the downlink message based on the second mapped security context.

23. The apparatus of claim 12, wherein the first network entity includes a Mobility Management Entity (MME) and the second network entity includes an Access and Mobility Management Function (AMF).

* * * * *